US010569913B2

(12) United States Patent
Voth et al.

(10) Patent No.: US 10,569,913 B2
(45) Date of Patent: Feb. 25, 2020

(54) APPARATUS AND METHOD FOR PRODUCING A PLASTIC BOTTLE AND FOR FILLING IT WITH A FILLING PRODUCT

(71) Applicant: Krones AG, Neutraubling (DE)

(72) Inventors: Klaus Voth, Obertraubling (DE); Volker Kronseder, Neutraubling (DE); Wolfgang Roidl, Deuerling (DE)

(73) Assignee: Krones AG, Neutraubling (DE)

( * ) Notice: Subject to any disclaimer, the term of this patent is extended or adjusted under 35 U.S.C. 154(b) by 641 days.

(21) Appl. No.: 14/678,887

(22) Filed: Apr. 3, 2015

(65) Prior Publication Data

US 2015/0284115 A1   Oct. 8, 2015

(30) Foreign Application Priority Data

Apr. 4, 2014   (DE) .................. 10 2014 104 874

(51) Int. Cl.
  *B29C 39/02* (2006.01)
  *B65B 3/02* (2006.01)
  (Continued)

(52) U.S. Cl.
  CPC .............. *B65B 3/022* (2013.01); *B29C 49/24* (2013.01); *B29C 49/28* (2013.01);
  (Continued)

(58) Field of Classification Search
  CPC ......... B65B 3/022; B65B 3/14; B65B 31/022; B65B 31/025; B65B 3/02; B65B 3/045; B65B 3/16; B65B 3/18; B65B 3/04–17; B29C 49/24; B29C 49/28; B29C 49/4273; B29C 49/62; B29C 49/06; B29C 49/12; B29C 49/783; B29C 2049/4664; B29C 2049/4697; B29C 2049/627; B29C 2791/006; B29L 2031/7158; B67C 3/16
  See application file for complete search history.

(56) References Cited

U.S. PATENT DOCUMENTS 3,996,725 A * 12/1976 Walles ............... B65B 31/027
                                                53/94
4,347,695 A *  9/1982 Zobel ................ B65B 31/006
                                               141/11
(Continued)

FOREIGN PATENT DOCUMENTS

CH       489427 A  *  4/1970  .............. B65B 3/14
CN      1078127        1/2002
(Continued)

OTHER PUBLICATIONS

Rosator, D.V., Plastics Processing Data Handbook, 1990, Van Nostrand Reinhold, p. 191 (Year: 1990).*

(Continued)

*Primary Examiner* — William P Bell
*Assistant Examiner* — Andrew L Swanson
(74) *Attorney, Agent, or Firm* — Haynes and Boone, LLP

(57) ABSTRACT

Methods for manufacturing a plastic container and for filling it with a fill product are described. The methods include introducing a perform into a blow mold, pressuring the preform with a blowing medium, evacuating the interior space of the container to an underpressure, and introducing a fill product in the interior space at an overpressure.

13 Claims, 13 Drawing Sheets

(51) Int. Cl.

| | | |
|---|---|---|
| *B65B 31/02* | (2006.01) | |
| *B29C 49/62* | (2006.01) | |
| *B29C 49/24* | (2006.01) | |
| *B29C 49/28* | (2006.01) | |
| *B29C 49/42* | (2006.01) | |
| *B65B 3/14* | (2006.01) | |
| *B65B 3/04* | (2006.01) | |
| *B65B 3/16* | (2006.01) | |
| *B65B 3/18* | (2006.01) | |
| *B29C 49/06* | (2006.01) | |
| *B29C 49/12* | (2006.01) | |
| *B29C 49/78* | (2006.01) | |
| *B29C 49/46* | (2006.01) | |
| *B29L 31/00* | (2006.01) | |

(52) U.S. Cl.
CPC .......... *B29C 49/4273* (2013.01); *B29C 49/62* (2013.01); *B65B 3/14* (2013.01); *B65B 31/022* (2013.01); *B65B 31/025* (2013.01); *B29C 49/06* (2013.01); *B29C 49/12* (2013.01); *B29C 49/783* (2013.01); *B29C 2049/4664* (2013.01); *B29C 2049/4697* (2013.01); *B29C 2049/627* (2013.01); *B29C 2791/006* (2013.01); *B29L 2031/7158* (2013.01); *B65B 3/04* (2013.01); *B65B 3/16* (2013.01); *B65B 3/18* (2013.01)

(56) References Cited

U.S. PATENT DOCUMENTS

| | | | | |
|---|---|---|---|---|
| 5,082,033 | A * | 1/1992 | Weiss | ................... B67C 3/06 |
| | | | | 141/198 |
| 6,082,418 | A * | 7/2000 | Naecker | ............... B65B 31/022 |
| | | | | 141/145 |
| 6,338,415 | B1 | 1/2002 | Grob | |
| 2002/0011681 | A1* | 1/2002 | Rose | ..................... B29C 49/18 |
| | | | | 264/40.1 |
| 2008/0156391 | A1* | 7/2008 | Behar | ..................... B65B 3/16 |
| | | | | 141/2 |
| 2012/0248660 | A1* | 10/2012 | Beuerle | ................. B29C 49/12 |
| | | | | 264/530 |

FOREIGN PATENT DOCUMENTS

| | | | | |
|---|---|---|---|---|
| CN | 103635389 | | 3/2014 | |
| DE | 43 20 098 | A1 | 12/1994 | |
| DE | 199 09 995 | A1 | 9/2000 | |
| DE | 102010032573 | A1 * | 2/2012 | ............... B67C 3/22 |
| DE | 10 2010 032 573 | A1 | 9/2012 | |
| DE | 10 2011 111 483 | A1 | 2/2013 | |
| EP | 1 520 833 | A1 | 8/2004 | |
| FR | 1354120 | A * | 3/1964 | ............... B65B 3/14 |
| FR | 1478975 | A * | 4/1967 | ............ B29C 49/48 |
| FR | 2737716 | A1 * | 2/1997 | ............... B67B 7/02 |
| JP | H03-043322 | | 2/1991 | |
| JP | H06329194 | | 11/1994 | |
| JP | H09048063 | | 2/1997 | |
| JP | H11-035003 | | 2/1999 | |
| JP | 2000043129 | | 2/2000 | |
| JP | 2002362689 | | 12/2002 | |
| JP | 2003160123 | | 6/2003 | |
| JP | 2004026187 | | 1/2004 | |
| JP | 3513673 | | 3/2004 | |
| JP | 2010-522670 | | 7/2010 | |
| JP | 2010235209 | | 10/2010 | |
| JP | 2011526852 | | 10/2011 | |
| WO | WO 2013/020884 | | 2/2013 | |

OTHER PUBLICATIONS

RIT, Chapter 6 Vacuum Pumps, Jan. 23, 2013 (date provided via Internet Archive, Rochester Institute of Technology, https://web.archive.org/web/20130123144717/https://people.rit.edu/vwlsps/LabTech/Pumps.pdf, p. 5 (Year: 2013).*

Chinese Office Action, Chinese Patent Application No. 201510160760.3, dated Nov. 15, 2016, 16 pages.

Japanese Office Action, Japanese Patent Application No. 2015-077714, dated Jan. 22, 2019, 7 pages.

Japanese Office Action, in corresponding Japanese Application No. JP 2015-077714, dated Oct. 8, 2019, 12 pages.

* cited by examiner

APPARATUS AND METHOD FOR PRODUCING A PLASTIC BOTTLE AND FOR FILLING IT WITH A FILLING PRODUCT

CROSS REFERENCE TO RELATED APPLICATIONS

This application claims priority from German Patent Application No. DE 10 2014 104 874.1, filed on Apr. 4, 2014 in the German Patent and Trademark Office, the disclosure of which is incorporated herein by reference in its entirety.

BACKGROUND

Technical Field

The present invention relates to manufacturing a plastic container and for filling it with a fill product, for example for manufacturing and filling blow molded or stretch blow molded polyethylene terephthalate (PET) bottles.

Related Art

Blow molding machines and stretch blow molding machines are known from the state of the art. On these machines, plastic containers, for example PET plastic bottles, are manufactured. For this purpose, so-called preforms are first heated in an oven and then, in the actual blow molding machine or stretch blow molding machine, introduced into a blow mold, which has an inner contour corresponding to the shape of the PET plastic bottle that is to be manufactured. These preforms are then inflated into finished plastic bottles by means of pressurization with a blowing medium. The contour of the container is impressed on it by the blowing pressure, which presses the material of the preform onto the inner wall of the cavity of the blow mold.

In the stretch blow molding method, prior to the main pressurization of the preform, or rather the interior of the preform, with a blowing medium, the preform is pre-stretched mechanically by means of a stretching rod, and at the same time the preform is pre-inflated. After it is pre-inflated the preform is pressurized with the blowing medium such that the preform is pressed onto the inner wall of the cavity of the blow mold. The blow mold is then opened, so that the fully blow molded or stretch blow molded PET plastic bottle can then be removed and conveyed to its further processing.

The blow mold usually has at least one separate blow mold base and two blow mold halves, which can be moved apart such as to allow the finished PET plastic container to be removed without problems. At the same time, a preform can also be introduced into the blow mold that has been opened in this manner.

Various different designs are possible for the blow molding machines. In particular, blow molding machines of the rotary type are known, which have circulating blow molds disposed on a carousel, so that substantially continuous manufacture of plastic bottles can be achieved. Blow molding machines with stationary blow molds are also known, in which a plurality of blow molds are normally disposed one behind the other, or a single blow mold is equipped with a plurality of cavities. In such a blowing device with stationary blow molds, PET plastic bottles can thus be manufactured in cyclic operations, and subsequently conveyed to their further processing.

After being manufactured in the blow molding machine and removed from their respective blow molds, the PET bottles are typically filled in a filler device, in which the containers are retained either at their base or, in the case of PET bottles, at their support ring, and filled by means of a fill product valve, which is known in the art. A wide variety of different filling systems and/or filling elements are known for filling PET plastic bottles, which enable for example free-jet filling, counter-pressure filling, weight filling, vacuum filling or dosing chamber filling, to name only some of the known filling methods.

Prior to the actual filling of the PET bottles, they are commonly rinsed or sterilized, in order to enable them to be filled in a hygienic or sterile manner. It is further known, prior to the actual filling of the containers with the fill product, in particular in the case of fill products that are sensitive to oxygen, to provide a defined gas composition in the containers, preferably a gas composition that is low in oxygen. For this purpose, the containers to be filled are usually subjected to gas flushing, in which an underpressure is first produced in the container, then a flushing gas, for example an inert gas such as $CO_2$ is introduced into the container. The fill product is then filled in this defined gas atmosphere. The flushing procedure can also be carried out repeatedly if an atmosphere particularly low in oxygen is required in the interior.

Methods for manufacturing and filling containers are also known in which the manufacture of the plastic bottles is carried out in a blow molding machine or stretch blow mold machine, and the containers are filled with the applicable fill product while still in the blow molding machine itself. The advantage of this method is that the interior space of each container is virtually sterile after its manufacture, because the preforms for blow molding have already been heated to high temperatures, such as at or above 100° C. When each plastic container is filled immediately after it is manufactured, sterile or at least hygienic filling of the applicable fill product is possible.

For example, from DE 26 57 670 A1 a blow molding and filling head for devices for molding and filling hollow bodies formed from thermoplastic materials is known, in which the molded containers are immediately charged with fill product by means of the blow molding and filling head.

From EP 1 529 620 A1, a filling head is known, in which the inflation of each plastic container is carried out by means of the fill product. Accordingly, the container is fully filled with the fill product immediately when manufacture is completed, so that in this case manufacture and filling take place simultaneously.

In the known methods by which the container is filled while still in the blow molding machine, the filling takes place in conditions of either ambient pressure or overpressure.

SUMMARY

Methods and devices for manufacturing a plastic container and for filling it with a fill product are provided, which further improves the efficiency of the filling process.

Accordingly, a methods for manufacturing a plastic container and for filling it with a fill product are described, including the introduction of a preform into a blow mold and the pressurization of the preform with a blowing medium in order to manufacture a plastic container. According to the present disclosure, the interior space of the plastic container accommodated in the blow mold is evacuated to an underpressure and a fill product at an overpressure is introduced into the interior space of the plastic container, which is at an underpressure.

Due to the fact that after the plastic container is blow molded and, before it is filled with the fill product, the container is brought to an underpressure, and the container is filled with fill product which is at an overpressure, particularly efficient and rapid filling of the plastic container with the fill product can take place. Filling can take place particularly rapidly because in this case the entire cross-section of the mouth can be used to introduce the fill product into the container, and backflow of fluid, for example gas displaced from the container by the entering stream of fill product, cannot take place, or, depending on the quality of evacuation, can take place only to a slight extent, since the container has already been substantially evacuated.

Furthermore, because a large difference in pressure exists between the interior space and the fill product that is supplied, it can be achieved that the fill product (from the point of view of the plastic container) is sucked into the container, or (from the point of view of the fill product feed) is pressed into the container.

Accordingly, particularly rapid filling of the plastic container can be enabled, which can moreover take place immediately after the container has been evacuated.

Prior to the introduction of the fill product, the plastic container is, in one embodiment, evacuated to an underpressure with an absolute pressure of about 0.5 bar to 0.05 bar, in a further embodiment, about 0.3 bar to 0.1 bar, and in another embodiment about 0.1 bar. Because the fill product is filled into such an underpressure in the plastic container, the interior space of the container is evacuated such that during its filling with the fill product no gas is displaced by the fill product, and accordingly no gas is forced to flow out of the interior space of the plastic container. Instead, the entire cross-section of the mouth of the plastic container can be used for the inflow of the fill product. In other words, the only flow that occurs in this case is a flow of fill product directed into the plastic container. The filling of the fill product is additionally facilitated by the pressure difference that has been provided between the underpressure in the plastic container that is to be filled and the overpressure in the fill product reservoir.

In a further embodiment of the method, the fill product is supplied at an overpressure corresponding to the ambient pressure, for example, at an absolute pressure of 1 bar. The overpressure is thereby established with respect to the underpressure in the plastic container, with the result that a pressure gradient exists between the fill product that is supplied and the plastic container.

The overpressure can also correspond to the saturated pressure of the fill product, and can lie at an absolute pressure of about 1.1 bar to 6 bar, in one embodiment at an absolute pressure of about 2.5 bar to 6 bar, and in another embodiment at an absolute pressure of about 2.8 bar to 3.3 bar. By means of an overpressure that corresponds to the saturated pressure, it is possible to counteract the release of the $CO_2$ in a carbonated fill product.

In some embodiments, the overpressure is higher than the saturated pressure of the fill product, and lies, for example, at an absolute pressure of about 1.6 bar to 9 bar. A high degree of overpressure, which is in particular above the saturated pressure of the fill product, makes it possible for the $CO_2$ in the fill product to be at saturation, and at the same time for the pressure gradient between the supplied fill product and the plastic container to be even greater, in order to accelerate the filling process still further.

By means of the pressure gradient that is provided between the fill product and the plastic container, it can be achieved that the filling of the plastic container takes place in a sudden burst. In this case, the filling in a sudden burst takes place substantially at the beginning of the filling process. Towards the end of the filling process, when the plastic container is largely already filled with the fill product, equalization can take place of the pressure in the headroom of the plastic container and the pressure in the fill product, which is supplied at an overpressure. This occurs because the pressure of the residual gas in the plastic container can now rise to atmospheric pressure, or to the pressure at which the fill product is supplied. The pressure difference that is reached, or the equalization of pressures, depends however on the initial pressures, and in particular on the initial underpressure in the plastic container that is to be filled.

In other words, the changes in pressure during the filling process in the plastic container to be filled are dependent on the initial pressure present in the plastic container to be filled at the beginning of the filling process, and thus also dependent on the residual gas present in the plastic container. The plastic container is filled by the fill product such that the fill product shares the available space with the residual gas. Accordingly, the pressure in the plastic container rises. The resulting pressure curve can therefore also be the means of determining the current filling status of the plastic container, and on this basis, for example, the point at which the end of the filling process will be reached can also be determined.

In order that the filling with fill product of the plastic container that is to be filled can be achieved in a manner that is particularly hygienic and low in oxygen, the plastic container to be filled is, in some embodiments, pre-evacuated initially, prior to the actual evacuation which is carried out in order to fill the plastic container with fill product, and subsequently flushed with a flushing gas. Following this, the plastic container is again evacuated to the above-mentioned underpressure, and the fill product is then filled into the plastic container that has been thus evacuated. In this manner, it can be achieved that the residual gas that is present in the plastic container is substantially a defined gas, for example $CO_2$, in order to enable the filling of the plastic container that is to be filled to take place in a defined atmosphere, and in particular in an atmosphere that is low in oxygen. By this means, an extended storage life and/or product life can be achieved, and it is thereby also possible to fill products that are sensitive to oxygen, such as for example beer.

After the fill product has been introduced, the filled plastic container is, in certain embodiments, pressurized with a pressure gas at an absolute pressure of about 2 bar to 9 bar, in further embodiments, an absolute pressure of about 3.5 bar to 7 bar, and in certain embodiments, an absolute pressure of about 3.8 bar to 5.5 bar. As the pressure gas, an inert gas, for example $CO_2$, can be used.

When the filled plastic container is pressurized with a pressure gas, for example $CO_2$, under a raised pressure, fill product foam that is present in the headroom of the filled plastic container can be pushed back and forced into the plastic container. Furthermore, the product fill pipe can be emptied of foam and residues of fill product. In addition, the pressurization of the plastic container with the pressure gas can promote renewed absorption or dissolution of the $CO_2$ in the fill product, with the result that the settling time of the fill product in the filled plastic container can be reduced, and the discharge or capping of the filled plastic container can accordingly be prepared.

In order to prevent the collapse of the plastic container when the interior space of the plastic container is evacuated, an underpressure is, in various embodiments, also provided outside the plastic container. For this purpose, for example, the space between the wall of the plastic container and the inner wall of the blow mold can be evacuated and also brought to an underpressure. In another embodiment, the pressures in the interior space of the evacuated plastic container and outside the evacuated plastic container are substantially equal. Because the same pressure conditions thus obtain in the interior space of the plastic container and on its outside, collapse of the plastic container due to the underpressure that is applied can be prevented.

The exterior space that is defined between the preform and/or plastic container and an inner wall of the cavity of the blow mold is, in several embodiments, evacuated to an underpressure before the preform is pressurized with the blowing medium, before the evacuation of the interior space of the plastic container, and/or before the fill product is introduced into the interior space of the plastic container. In this case, the exterior space is, in one embodiment, evacuated to an underpressure at an absolute pressure of about 0.5 bar to 0.05 bar, in a further embodiment, about 0.3 bar to 0.1 bar, and in another embodiment, about 0.1 bar. In some embodiments, prior to the introduction of the fill product into the interior space of the plastic container the pressure in the interior space and in the exterior space is equalized.

The underpressure in the blow mold can thereby be applied prior to the blow molding or stretch blow molding of the plastic container from the preform. In this manner, the blow molding process or stretch blow molding process can be facilitated, with the result that the plastic container can be manufactured with a lower blowing pressure, making its manufacture as a whole less expensive.

The pressure applied in the interior space of the plastic container and in the blow mold can, however, also be varied over the course of the manufacturing process, for example in order to make it easier to detach the manufactured plastic container from the walls of the blow mold. For this purpose, for example, a slight underpressure can initially be provided in the plastic container when it has been blow molded, so that it slightly contracts or slightly collapses, in order to enable it to be detached from the walls of the cavity of the blow mold. It is also possible after the manufacture of the plastic container to apply a slight initial overpressure in the blow mold with respect to the interior space of the plastic container, i.e. between the walls of the cavity and the wall of the plastic container, in order to facilitate detaching. This could also be performed after completion of the filling process.

After the filling of the plastic container with the fill product, both the plastic container and the blow mold, e.g., the space between the plastic container and the walls of the cavity in the blow mold, can be brought back to the same pressure or to atmospheric pressure, and the plastic container, having completed its filling, can be discharged.

In certain embodiments, it is possible to pressurize the interior space with a pressure gas after filling is completed, for example with an inert gas, in order to provide the headroom volume in the plastic container with a defined atmosphere. This can be valuable particularly in the case of beverages that are sensitive to oxygen, in which case the headroom is, in various embodiments, pressurized with an inert gas.

The filling method described above is particularly suitable for filling still beverages, for instance still water, juices or tea products, which can be introduced in a sudden burst into the plastic container that is to be filled. Because still beverages have little or no tendency to foam, the interior space of the plastic container can immediately be brought back to the ambient pressure when it has been filled, and for example, after the filled plastic container is demolded from the blow mold, the filled plastic container can be conveyed to a subsequent processing station, for example a capper.

If the method and the device are to be used to fill carbonated beverages, for example soft drinks, beer or carbonated mineral water, increased release of $CO_2$ takes place when the interior space of the plastic container, which is at an underpressure, is filled with the carbonated beverage in a sudden burst. Accordingly, in this case, there is a high tendency of the carbonated fill product to foam, with the result that equalization of the pressure in the interior space with the ambient pressure immediately after filling would lead to the fill product spurting out or foaming over. Therefore, in some embodiments, at least when filling the plastic container with a carbonated fill product, it may be desired to charge the filled plastic container with a pressure gas that is under pressure, for example $CO_2$ under pressure, wherein the pressure is, in one embodiment, at least the saturated pressure, and in a further embodiment, above the saturated pressure, of the $CO_2$ in the carbonated fill product. In this manner excessive release of the $CO_2$ from the fill product can be avoided, and renewed dissolving of the $CO_2$ into the carbonated fill product can be further facilitated. Correspondingly, the settling phase, during which the carbonated fill product re-settles, can be accelerated by means of the pressurizing of the interior space to an increased $CO_2$ pressure, thus shortening the settling time. Accordingly, after a shorter time the pressure in the plastic container, which was pressurized in this manner by the pressure gas, can be relieved and returned to normal pressure, without the risk of excessive foaming over or spurting out of the fill product from the plastic container then taking place.

The plastic container is then, in some embodiments, closed at this pressure level. For this purpose, either the plastic container, whose filling is now completed, can be removed from the blow mold and conveyed to a suitable capper under the applicable pressurized atmosphere, or else the closing can take place while the plastic container is still under pressure in the blow mold.

As already described above, in some embodiments, the plastic container is filled with a still fill product, i.e., not a fill product to which $CO_2$ is present, such as for example a still beverage, for instance a still water, a juice or a tea product. When filled with a still fill product, the filled container can be closed under ambient pressure conditions (1 bar absolute pressure). Accordingly, after the actual filling process the pressure in the filled container can be relieved, for example to ambient pressure, and the container can then be conveyed to a suitable capper, which then closes the filled container, also substantially under atmospheric pressure conditions.

Before and during the capping process, it is also possible to introduce an inert gas into the headroom of the filled plastic container, for example by means of blowing a gaseous inert gas onto or into it, or by adding drop-wise a liquefied inert gas such as for example liquid nitrogen, which then transitions to a gaseous phase during and after the capping of the plastic container. Accordingly, the capping of the filled plastic container can also take place at a different pressure from its filling.

A particularly efficient filling process takes place if both the blow molding of the plastic container and the filling of the plastic container are carried out by the same nozzle, since the separate steps of evacuation and filling can be performed without a change of nozzle. In a variant, however, it is also possible to exchange the blowing nozzle for a filling nozzle.

In certain embodiments, prior to and/or during and/or after the introduction of the fill product into the interior space of the plastic container, at least one flavoring and/or beverage supplement and/or beverage component is dosed into the interior space of the plastic container. The term "beverage supplement" is to be understood here also to include syrup and/or preservatives.

By means of the dosing of the flavoring and/or beverage supplement and/or beverage component into the interior space of the plastic container, flexible dosing of flavorings and/or beverage supplements and/or beverage components can be achieved, which makes it possible to change quickly between different flavors and tastes. Due to the rapid filling process, as has been described above, part of the treatment angle in a rotary filler can be used for other functions. Accordingly, the method described above enables the additional provision of a flavor doser for dosing flavorings and/or beverage supplements and/or beverage components, so that an advantageous change between different tastes is possible.

A device for manufacturing a plastic container and for filling it with a fill product is also provided.

Accordingly, a device for manufacturing a plastic container and for filling it with a fill product is described, including a blow mold for blow molding or stretch blow molding a plastic container from a preform, and a fill product feed for feeding a fill product into the plastic container while it is still accommodated in the blow mold. According to the present disclosure, a vacuum device may be provided for evacuating the interior space of the plastic container accommodated in the blow mold prior to the filling of the fill product.

Because the device, in some embodiments, has a vacuum device for providing an underpressure in the interior space, it is possible to evacuate the interior space before it is filled with the fill product, in order by this means to achieve the acceleration of the filling process that has already been described above.

The blow mold, in certain embodiments, is pressure tight, such that an underpressure can also be applied in the blow mold. As described above with reference to the method, by means of the application of an underpressure between the wall of the plastic container and the wall of the cavity of the blow mold, it can be achieved that the plastic container does not collapse when it is evacuated. It is further possible to establish defined pressure conditions on the outside of the plastic container, in order for example to facilitate the detaching of the plastic container from the walls of the blow mold.

The blow mold, in some embodiments, is placed in communication with the vacuum device, in order that a cavity in the blow mold can be evacuated to an underpressure prior to the introduction of the fill product into the plastic container.

A blowing nozzle is, in various embodiments, provided for blow molding or stretch blow molding a preform disposed in the blow mold into a plastic container, and the blowing nozzle is further configured to evacuate the interior space of the plastic container and introduce a fill product into the evacuated interior space of the plastic container.

It is advantageous if a blowing nozzle is provided for blow molding or stretch blow molding a preform disposed in the blow mold into a plastic container, and a filling nozzle is further provided for evacuating the interior space of the plastic container to an underpressure and for filling a fill product into the evacuated interior space of the plastic container, wherein the blowing nozzle and the filling nozzle can be successively brought into pressure-tight engagement with the mouth of the preform or the mouth of the plastic container.

In a further embodiment, a plurality of blow molds can be disposed on a rotary carousel, and on the rotary carousel it is possible to carry out not only the blow molding or stretch blow molding of a plastic container from a preform accommodated in the applicable blow mold, but also evacuation of the interior space of the plastic container and introduction of the fill product into the evacuated interior space.

In some embodiments, a capper is provided, by means of which the filled plastic container can be closed without relieving the pressure in the plastic container to ambient pressure. By this means, the relieving of the pressure in the filled plastic container can be avoided, and the filling process can thereby be accelerated, since it is not necessary to wait until the fill product has settled in order to prevent the fill product foaming over, spurting out or overflowing. Instead, the capping takes place under the same conditions, in particular under the same pressure conditions, as the filling.

The actual capping of the filled plastic containers can be performed by means of generally known cappers with generally known caps. The capper can accordingly be, for example, a crown corker, a plug capper, a screw capper or a roll-on capper.

In various embodiments, a capping head is provided, which has a capping head area that is sealed against the environment, and which accommodates the product fill pipe and a capper together with the mouth of the plastic container. In certain embodiments, the capping head area can be opened and closed to accommodate the plastic container, and in other embodiments, has two capping head jaws which can be opened and closed to accommodate the plastic container and preferably to supply a container cap. By means of such a capping head, filling and capping can be carried out in the capping head area in the same gas atmosphere and at the same pressure.

An overpressure can be advantageously applied to the fill product feed, which is additionally, in some embodiments, embodied as a fill product reservoir with a gas compartment that is above a fill product level and pressurized, or as a line filled with fill product and pressurized, and in some embodiments, as a pressurized black-filled line.

In an advantageous further embodiment, the product fill pipe has a cross-section identical to the cross-section of the mouth of the plastic container that is to be filled, and in particular the entire cross-section of the mouth of the plastic container that is to be filled can be used to fill the fill product. By means of the use of the entire cross-section of the mouth, particularly rapid filling of the fill product can be achieved.

In an additional advantageous further embodiment, a flavor doser is provided for dosing a flavoring and/or a beverage supplement and/or a beverage component into the interior space of the plastic container. The flavor doser can, for example, be provided in the form of a peristaltic pump, by means of which the flavoring and/or the beverage supplement and/or the beverage component is pumped out of a corresponding reservoir and dosed.

BRIEF DESCRIPTION OF THE FIGURES

Further embodiments and aspects of the present invention are more fully explained by the description below of the figures.

DETAILED DESCRIPTION

Figure 1:
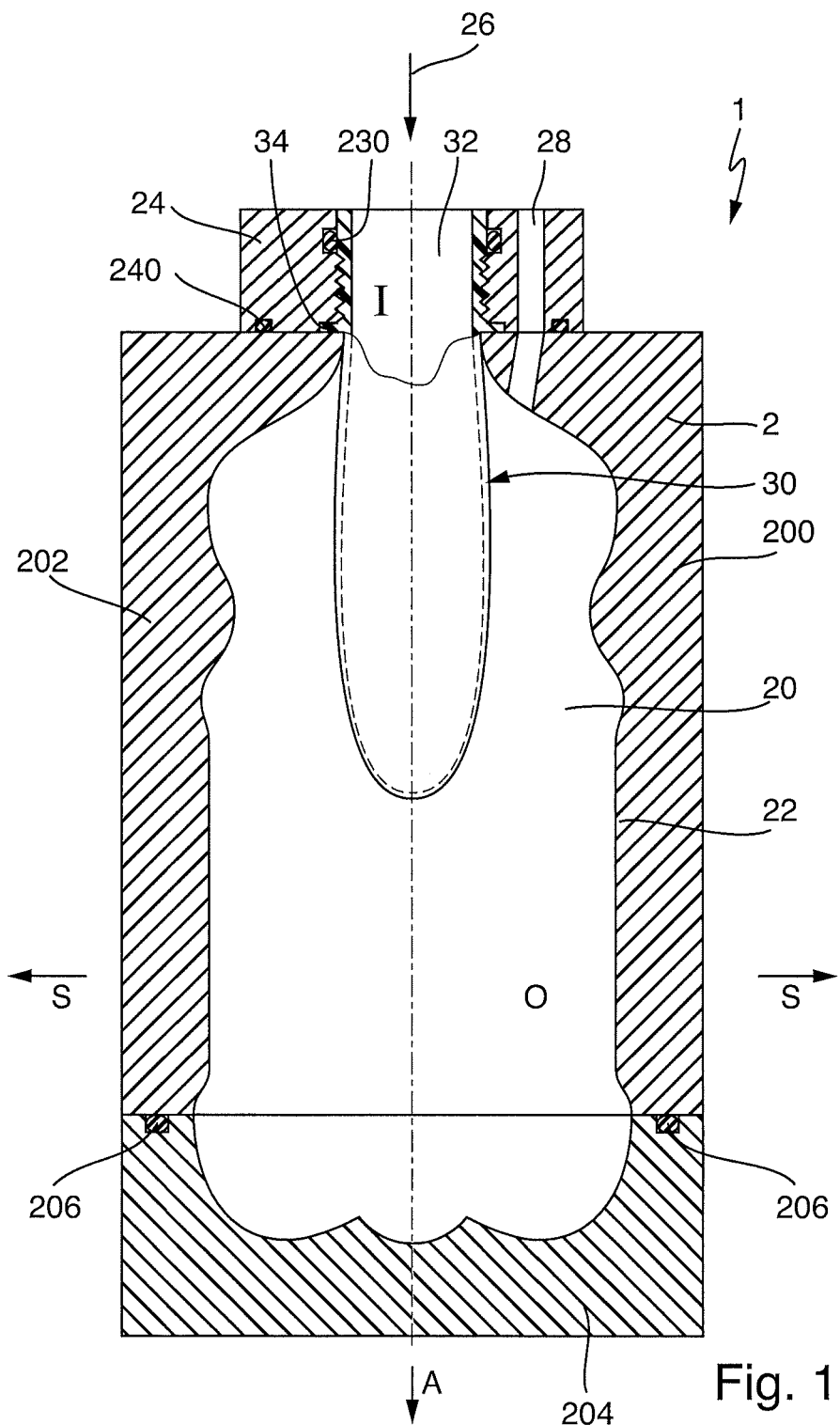
FIG. 1 is a schematic sectional view through a first device for manufacturing a plastic container and for filling it with a fill product, with a preform accommodated in the blow mold.

Examples of embodiments are described below with the aid of the figures. In the figures, elements which are identical or similar, or have identical effects, are designated with identical reference signs, and repeated description of these elements is in part dispensed with in the description below, in order to avoid redundancy.

In FIGS. 1 to 4, a device 1 for manufacturing plastic containers and for filling them with a fill product is shown schematically. For manufacturing the plastic containers, a blow mold 2 is provided, which has a cavity 20 with an inner wall 22 that corresponds to the outer contours of the plastic container that is to be manufactured. In the blow mold 2, a plastic container can be manufactured in a manner known in the art from a heated preform by means of blow molding or stretch blow molding. In the stretch blow molding process, the heated preform is pre-stretched with a stretching rod and simultaneously pre-inflated, then fully blow molded by means of pressurization with the blowing medium, for example compressed air, so that the walls of the plastic container 3 that is produced in this manner follow the contours of the inner wall 22 of the cavity 20 of the blow mold 2.

The blow mold 2 has two blow mold side sections 200 and 202 and a blow mold base 204. To open the blow mold 2, in order for example to insert a new preform or remove a finished plastic container, the two blow mold side sections 200 and 202 can be displaced apart in the sideways direction shown schematically by the arrow S, and the blow mold base 204 can be displaced downwards in the direction indicated by the arrow A. The two blow mold side sections 200 and 202 together with the blow mold base 204 form the blow mold 2 and enclose the cavity 20. The blow mold side sections 200 and 202 and the blow mold base 204 are separated such that, when the blow mold side sections 200 and 202 are displaced in the sideways direction S and the blow mold base 204 is displaced in the downwards direction A, a blow molded plastic container in the cavity 20 can be removed from the cavity 20, without being blocked by indentations. Such blow molds 2 are known in the art.

The blow mold 2 that is shown is implemented in a pressure-tight form by means of schematically shown gaskets 206, such that an overpressure established in the cavity 20 of the blow mold 2, or an underpressure established in the cavity 20, can be substantially retained.

A preform 30 is inserted in the cavity 20 of the blow mold 2 such that the mouth area 32 of the preform 30 (which also comprises the thread), and the support ring 34, hold the preform 30 securely in the cavity 20. In the example embodiment that is shown, a neck holder 24 is provided for this purpose. The neck holder 24 is sealed in a pressure-tight manner against the blow mold side sections 200 and 202 by means of a neck holder gasket 240. A neck gasket 230 is further provided, which enables the pressure-tight sealing of the mouth area 32 of the preform 30 against the neck holder 24.

By means of the gaskets that are shown, the preform 30 can be accommodated in the blow mold 2 such that the interior space I of the preform is separated in a pressure-tight manner from the exterior space O, which is formed between the outer wall of the preform 30 and the inner wall 22 of the cavity 20 of the blow mold 2. Accordingly, the exterior space O between the preform 30 and the inner wall 22 of the blow mold 2 is sealed against the interior space I of the preform 30, with the result that differing pressures can exist and can be retained in the interior space I and the exterior space O.

The exterior space O between the preform 30 and the inner wall 22 of the cavity 20 of the blow mold 2 is furthermore fully sealed against the environment. The inserted preform 30, which is sealed via the neck gasket 230, thus acts in principle as a stopper by means of which the inlet area 26 of the blow mold 2 is closed.

The exterior space O is accessible via a pressure equalization channel 28. The interior space I is accessible via the mouth area 32 of the preform 30.

If the preform 30 is inserted in the blow mold 2 and the blow mold side sections 200 and 202 as well as the blow mold base 204 are closed in a sealed manner, the actual blow molding process or stretch blow molding process can begin. The preform 30 is thereby usually inserted in the blow mold 2 in a pre-heated state, typically at a temperature of approximately 100° C. The preform is accordingly heated in an oven prior to being inserted in the blow mold 2.

Figure 2:
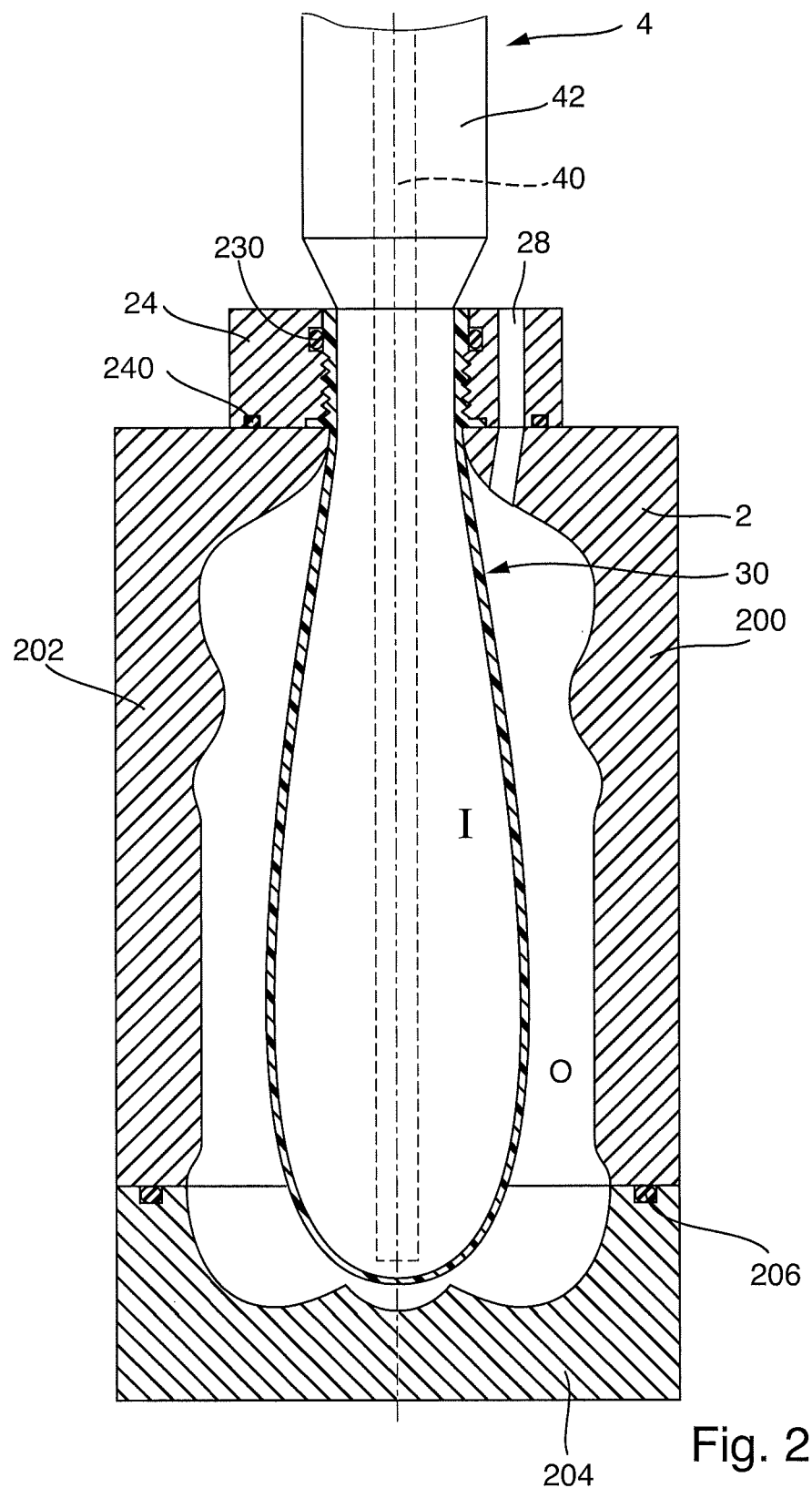
FIG. 2 is a schematic sectional view of the blow mold shown in FIG. 1, with a pre-stretched and pre-inflated preform.

FIG. 2 shows schematically a first step in the stretch blow molding process, in which a blowing nozzle 4 is disposed on the neck holder 24 such that it forms a seal, and a stretching rod 40 is introduced into the preform 30. By means of the stretching rod 40 the preform 30 is pre-stretched. At the same time, pre-inflation takes place via a blowing medium channel 42. This is followed by the blow molding of the plastic container.

Figure 3:
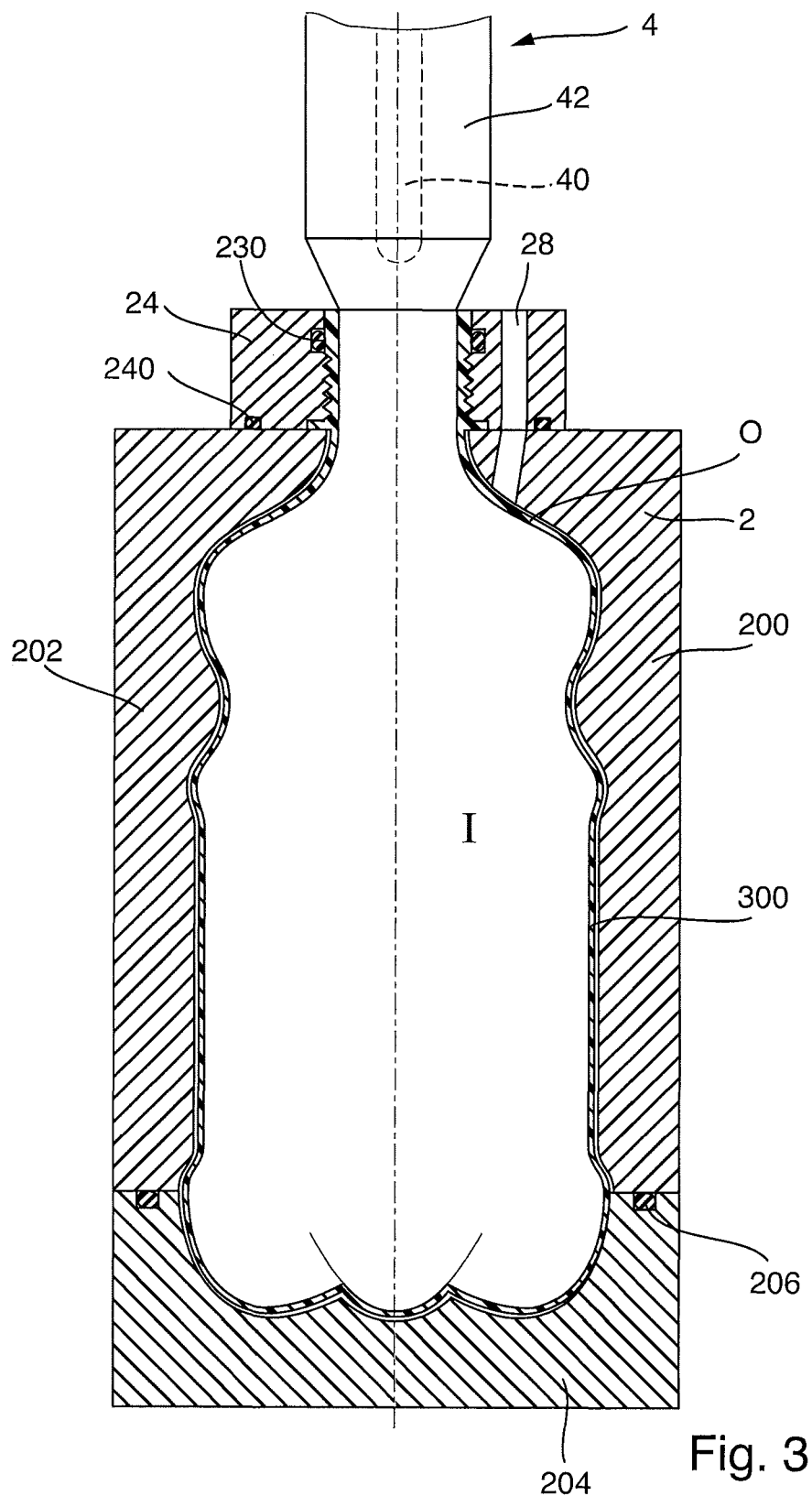
FIG. 3 is a schematic sectional view through the blow mold of FIGS. 1 and 2, with a finished blow-molded plastic container.

FIG. 3 shows schematically the state in which the blow molding process is completed. Here the stretching rod 40 has already been withdrawn, and the interior space I of the now fully blow molded plastic container 3 is at an overpressure supplied by means of the blowing medium channel 42. This overpressure ensures that the container wall 300 abuts the inner wall 22 of the cavity 20 and follows the contours of the inner wall 22 of the cavity 20. Accordingly, the plastic container 3 that has been manufactured in this manner has an external shape that was imposed by the inner wall 22 of the cavity 20.

The gas that is present in the exterior space O, for example the ambient air which was admitted when the preform 30 was inserted prior to the closing of the blow mold 2, as can be seen in FIG. 1, can escape via the pressure equalization channel 28. Thus in the interior space I of the plastic container 3 an overpressure exists with respect to the exterior space O in the blow mold 2, which is for example at atmospheric pressure (1 bar), this pressure being established via the pressure equalization channel 28.

In an alternative process, the exterior space O can be evacuated before the stretch blow molding begins. This enables the blow molding process to be facilitated by the underpressure applied in the exterior space O, so that it is possible to reduce the pressure that needs to be applied in the interior space I of the plastic container 3 for the blow molding or stretch bow molding process. This application of an underpressure in the exterior space O can also reduce the amount of compressed air required during the blow molding or stretch bow molding process, making the process as a whole less expensive. The application of an underpressure to the exterior space O thus facilitates the process of molding the plastic bottle.

The underpressure applied to the exterior space O in order to facilitate the blow molding or stretch blow molding process is, in various embodiments, an absolute pressure of about 0.5 bar to 0.05 bar.

Figure 4:
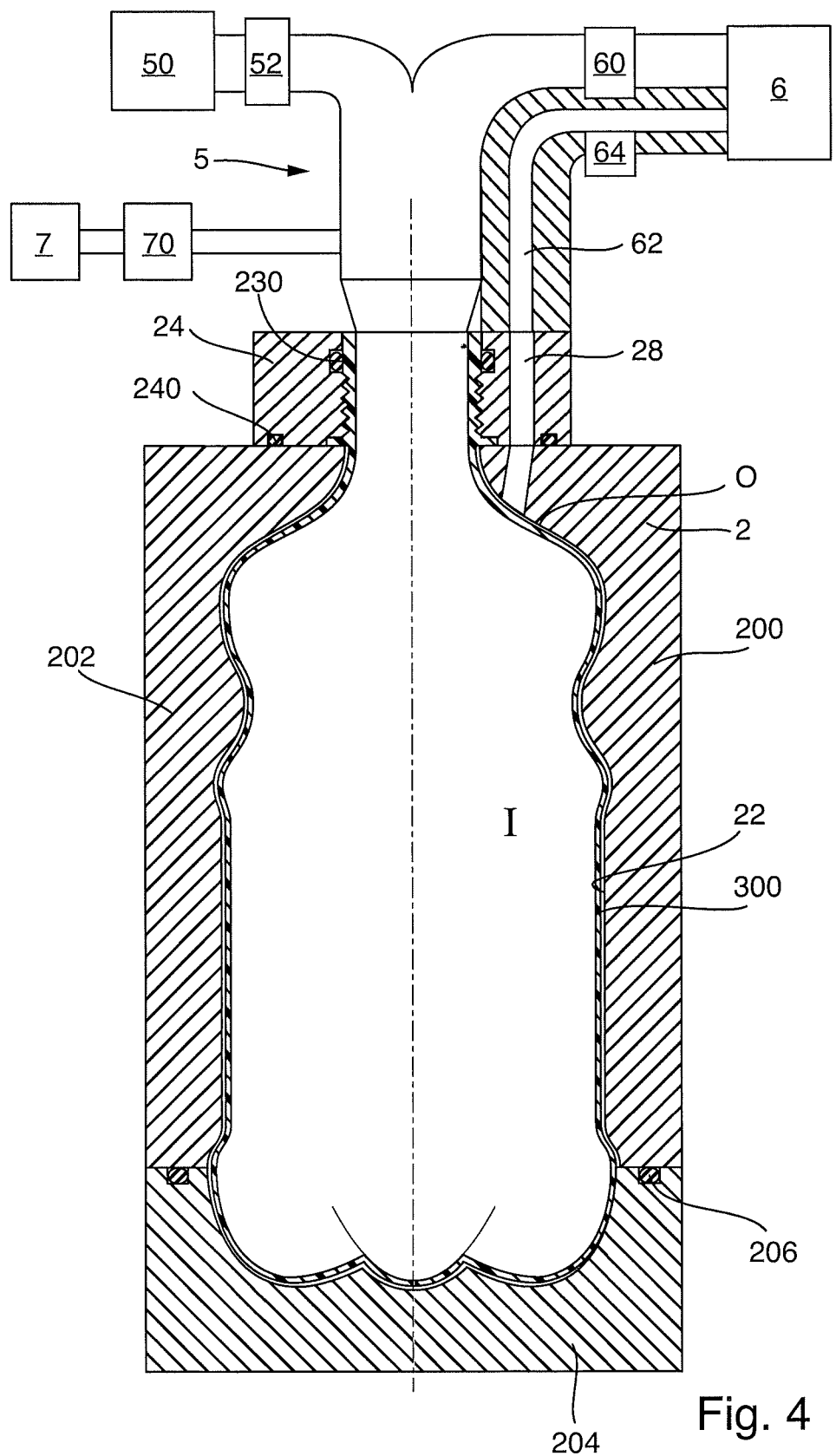
FIG. 4 is a schematic sectional view through the blow mold of FIGS. 1 to 3, with a slightly contracted plastic container.

In FIG. 4, a filling nozzle 5 is now disposed on the inlet area 26 of the blow mold 2 such that it forms a seal. The filling nozzle 5 is connected with both a (schematically indicated) fill product feed 50 and a vacuum device 6. By means of a fill product valve 52, the fill product feed 50 can be placed in communication with the filling nozzle 5, in order to introduce a fill product into the plastic container 3. Via a vacuum valve 60, the filling nozzle 5 can be placed in communication with the vacuum device 6, in order to evacuate the plastic container 3.

The fill product feed 50 can for example be connected with a fill product reservoir, to which an overpressure is applied such that the fill product reservoir as a whole is pressurized. The gas accommodated in a gas compartment of the fill product reservoir is, in several embodiments, an inert gas, for example $CO_2$. This is in particular the case when the fill product is a carbonated beverage, such as for example beer, a soft drink or mineral water.

If the fill product is a carbonated fill product, the provision of an overpressure in the fill product feed 50 can serve to provide sufficient pressure to prevent the release of CO2 from the fill product. In certain embodiments, an absolute pressure of about 1 bar to 9 bar is provided in this case, in one embodiment, an absolute pressure of about 2.5 bar to 6 bar, and in another embodiment, an absolute pressure of about 2.8 bar to 3.3 bar.

In a further embodiment, the fill product in the fill product feed 50 can be supplied at an overpressure which corresponds to the ambient pressure, and in one embodiment, at an absolute pressure of 1 bar. The fill product can also be supplied at an overpressure which corresponds to the saturated pressure of the fill product, and in one embodiment, at an absolute pressure of about 1.1 bar to 6 bar. In a further embodiment, the fill product can also be supplied at an overpressure that is higher than the saturated pressure of the fill product, such as at an absolute pressure of about 1.6 bar to 9 bar.

By means of the vacuum device 6, the interior space I of the plastic container 3 can be evacuated, and thereby the gas that is present in the interior space I of the plastic container 3 can be pumped out. The pressure that can be provided by the vacuum device 6 in the interior space of the plastic container 3 is, in various embodiments, an absolute pressure of about 0.5 bar to 0.05 bar, in other embodiments, about 0.3 bar to 0.1 bar, and in certain embodiments, approximately 0.1 bar. A large portion of the gas that is present in the interior space I can thus be pumped out by means of the vacuum device 6.

By means of the vacuum device 6, which can be placed in communication with the interior space I of the plastic container 3, the interior space I can thus be evacuated prior to the actual filling with the fill product. For this purpose, when the vacuum valve 60 is opened the gas that is present in the interior space I is withdrawn by means of the vacuum device 6. The gas that is present in the interior space I of the plastic container 3 is typically the blowing medium, by means of which the plastic container 3 was blow molded from the preform 30.

The vacuum device 6 is, in certain embodiments, configured such that it can provide a significant underpressure in the interior space I, for example in the range of an absolute pressure of about 0.5 bar to 0.05 bar.

The valves, in particular the fill product valve 52 and the vacuum valve 60, are, in various embodiments, controlled by means of a control device, which is not explicitly shown here. The control device can be implemented either as an analogue controller, or advantageously as a programmed controller, for example in the form of a PC or industrial PC. The control device can also be a module of the overall control system of a blow molding machine or a filling plant.

The control device may be configured to carry out the methods described here, and is in particular programmed to carry out the methods and control the applicable components of the plant. Accordingly, the valves and components are actuated in sequence such that the methods execute in the described form.

In exemplary embodiments, although not indicated in the figures, the control device is connected with sensors and transmitters, which for example monitor the pressure conditions in the interior space I of the plastic container 3.

The pressure equalization channel 28 is also connected with the vacuum device 6, via a vacuum line 62 and a pressure equalization valve 64, in order that evacuation of the exterior space O is also possible. The underpressures that are to be reached by this means in the exterior space O thereby correspond to those that can be reached in the interior space I.

In an alternative embodiment, the pressure in the interior space I can also differ from the pressure in the exterior space O.

In the example embodiment that is shown, in order now to fill the plastic container 3 with the fill product the filling nozzle 5 is first placed in communication, via the vacuum valve 60, with the vacuum device 6. The interior space I of the plastic container 3 is accordingly evacuated, such that an underpressure is provided in the interior space I.

Simultaneously, the exterior space O is connected with the vacuum device 6 via the pressure equalization channel 28, the vacuum line 62 and the pressure equalization valve 64, such that an underpressure is also provided in the exterior space O. When the vacuum valve 60 and the pressure equalization valve 64 open simultaneously, and thereby establish a connection with the vacuum device 6, the underpressure that is applied in the exterior space O is substantially identical to the pressure provided in the interior space I. In other words, the same underpressure is provided in both the interior space I and the exterior space O.

In some embodiments, the pressures in the interior space I and in the exterior space O can be slightly different, and the difference between them, or their absolute pressures, can vary over time.

In order to prevent the outside of the wall 300 of the plastic container 3 from adhering to the inner wall 22 of the cavity 20 of the blow mold 2 after blow molding, or in order to facilitate the detaching of the container wall 300 from the inner wall 22 of the blow mold 2, the pressure in the interior space I of the plastic container 3 can be lower than the pressure in the exterior space O. The plastic container 3 thereby contracts slightly, with the result that the wall 300 of the plastic container 3 detaches completely, or at least over part of its area, from the inner wall 22 of the cavity 20 of the blow mold 2, as shown schematically in FIG. 4.

In other embodiments, the application of an underpressure to the exterior space O can also be slightly delayed from the application of an underpressure to the interior space I, so that first the wall 300 of the plastic container 3 is detached from the inner wall 22 of the cavity 20, and only then is the underpressure provided in the exterior space O. For this purpose the vacuum valve 60 and the pressure equalization valve 64 are opened successively with a brief intervening interval, so that initially the interior space I of the plastic container 3 is placed in communication with the vacuum device 6, and only subsequently the exterior space O. In this manner it is also possible to apply an oscillating sequence of pressures, such that a plurality of compressions and corresponding expansions of the container wall 300 of the plastic container 3 can be achieved, in order to detach the container wall 300 completely from the inner wall 22 of the blow mold 2.

After both the interior space I and the exterior space O have been brought to the same underpressure, or to a similar underpressure, the vacuum valve 60 and the pressure equalization valve 64 are closed, and the fill product valve 52 is opened, in order to allow the fill product to flow out of the fill product feed 50 into the interior space I.

The fill product from the fill product feed 50 is thereby at an overpressure relative to the underpressure that is present in the interior space I. Due to the pressure difference, or pressure gradient, the filling of the interior space I with the fill product therefore takes place in a sudden burst. The filling process takes place particularly rapidly, not only because of the large pressure gradient, but also because no backflow of fluid takes place through the mouth area 32 of the plastic container 3. Instead, the fill product supplied from the fill product feed 50 begins to fill the interior space I such that the underpressure in this space gradually decreases.

In order to fill a plastic container 3, which was produced in the blow mold 2 and is still accommodated within it, the interior space I of the plastic container 3 is evacuated by means of the vacuum device 6 while the fill product valve 52 is closed and the vacuum valve 60 is open, and thereby brought to an underpressure. When the predetermined underpressure, for example about 0.1 bar, is reached in the interior space I of the plastic container 3, the vacuum valve 60 is closed and the fill product valve 52 is opened. Due to the large pressure difference between the interior space I of the plastic container 3, in which an underpressure prevails, and the fill product, which is at an overpressure, the plastic container 3 is initially filled with the fill product in a sudden burst. By this means the filling procedure can be carried out very rapidly, and is correspondingly quickly completed. At the same time the plastic container 3 is protected from collapse by the underpressure applied in the exterior space O.

The underpressure in the exterior space O can also be reduced during the filling process, since during the filling process the underpressure in the interior space I is correspondingly reduced. The underpressure in the exterior space O needs only to be maintained at a level sufficient to prevent the collapse of the plastic container 3 due the underpressure in its interior space I. The appropriate control of the pressure in the exterior space O can be achieved via the pressure equalization channel 28.

In one embodiment, the pressure in the exterior space O follows the pressure in the interior space I, so that in this case substantially the same pressure prevails at all times during the filling process. In this manner it is still possible to avoid collapse, because of the inherent stability of the plastic bottle 3, but it is also possible to prevent excessive pressure of the walls of the plastic bottle 3 on the inner wall 22 of the blow mold 2, so that adhesion or baking-on of the container walls onto the inner wall 22 of the blow mold 2 can also be reduced or prevented.

Beyond a certain fill level, the pressure in the exterior space O can also be greater than in the interior space I, in order to facilitate the detaching of the plastic bottle 3 from the inner wall 22 of the blow mold 2.

Due to the underpressure already present in the plastic container 3, during the filling process, or at least in the first phase of filling, no gas is displaced out of the plastic container 3 when the fill product flows in. Instead, the underpressure that is present in the interior space I is merely reduced. Because of this, the fill product can flow into the plastic container 3 through the entire cross-section of the mouth. It can thereby be achieved, at least during the major part of the filling process, that the filling of the plastic container 3 with the fill product takes place with a fluid flow in only one direction, namely a fluid flow that is directed exclusively into the plastic container 3. There is no flow of a fluid, for example a gas, in the opposite direction, because no displacement of gas out of the plastic container 3 takes place. Instead, the filling of the plastic container 3 causes merely a gradual reduction in the underpressure that is present in the interior space I of the plastic container 3. Only towards the end of the filling process will the inflow of fill product decelerate, when in the interior space I of the plastic container 3 a slow rise in pressure occurs, and possibly the equalization of the pressures in the plastic container 3 and the fill product occurs.

It is however also possible to avoid such deceleration, depending on the underpressure provided in each case in the interior space I of the plastic container 3. The lower the pressure in the plastic container 3 that is to be filled, the less deceleration will take place, since if the lower pressure that is present in the plastic container 3 before it is filled is still present at the time at which the fill product valve 52 is closed, a significant underpressure will continue to prevail in the plastic container 3.

The time at which deceleration takes place therefore depends on the underpressure present in the plastic container 3, and consequently on the design of the vacuum device 6. The lower the pressure in the plastic container 3, the later the pressures will equalize, or else, in the extreme case of a particularly high vacuum in the plastic container 3, pressure equalization will not take place at all. Instead, an underpressure will continue to exist in the headroom, even if the desired fill volume has already been reached and the fill product valve 52 has already been closed. This effect can also be achieved if initially a relatively weak underpressure is produced, and during the filling process, i.e. when the underpressure in the container decreases, the vacuum creating device 6 is again brought into operation, in order to produce additional underpressure, or to decrease the pressure which is presently rising.

After the filling process is ended in this manner and the plastic container 3 is filled with the desired quantity of fill product, the fill product valve 52 closes.

If the fill product is a still fill product, for example a still water or a fruit juice, the underpressure in the interior space I and the exterior space O can be relieved to ambient pressure following the fill process, and the plastic container 3 can be demolded from the blow mold 2 by means of the opening of the two blow mold side sections 200 and 202 and the blow mold base 204, then conveyed to the next treatment station, for example a capper. This process may be desired in some embodiments, since if the filling of the plastic container 3 that is to be filled is carried out inside the blow mold 2, it takes place so rapidly, due to the underpressure that is present in the interior space I, that the process time does not significantly increase, or does not increase at all, by comparison with a purely blow molding process without filling. Accordingly, it is possible to obtain a ready-filled plastic container 3 in a process time equal to that which was required in conventional blow molding machines for the blow molding of the plastic container alone.

The filled plastic container 3 can then be transported, for example, to a capper, which attaches a container closure to the plastic container 3. The transport of the filled plastic container 3 to the capper can take place either in a clean room atmosphere or under ambient conditions. If in this case the transport is in a clean room atmosphere, the capper and the blow molding machine are usually disposed in the same isolator, or at least connected with each other via a channel with a defined atmosphere.

If the filled fill product is a carbonated fill product, such as for example beer, mineral water or a soft drink, a pressure gas can additionally be introduced into the interior space I, by means of a pressure gas device 7 which is placed in communication via a pressure gas valve 70 with the filling nozzle 5, in order to prevent excessive release of the $CO_2$ dissolved in the fill product, or facilitate renewed dissolving of the $CO_2$ that is present in the fill product.

By means of the pressure gas device 7, for example, $CO_2$ can be introduced into the plastic container 3 when the pressure gas valve 70 is open. A different inert gas can also be used as the pressure gas. The pressure gas can pressurize the filled plastic container 3 to an absolute pressure of about 2 bar to 9 bar, in some embodiments, an absolute pressure of about 3.5 bar to 7 bar, and in other embodiments, an absolute pressure of about 3.8 bar to 5.5 bar.

An exemplary method for filling products that are sensitive to oxygen again includes first the evacuation by means of the vacuum device 6 of the plastic container 3, by means of the opening of the vacuum valve 60 while the fill product valve 52 is closed and the pressure gas valve 70 is closed. At a pressure of about 0.1 bar, the evacuation has removed 90% of the atmospheric oxygen from the plastic container 3. When the desired underpressure in the plastic container 3, for example a pressure of about 0.1 bar, has been reached, the vacuum valve 60 is closed and the pressure gas valve 70 is opened, and pressure gas, for example $CO_2$, is accordingly introduced into the plastic container 3 via the pressure gas device 7.

Following the introduction of the pressure gas via the pressure gas device 7, the pressure gas valve 70 is again closed and the vacuum valve 60 is again opened, so that the gas mixture can again be drawn out of the plastic container 3 via the vacuum device. In this manner, it is possible to achieve, alongside a reduction of the pressure in the plastic container 3 to about 0.1 bar, a 99% reduction of the oxygen in the plastic container 3 in comparison with the initial level. This may be desired if oxygen-sensitive products are to be filled and compressed ambient air is used as the blowing medium. This is because the gas mixture that is present in the interior space I of the finished blow molded plastic container 3 after the blow molding process is complete is air, with the corresponding proportion of atmospheric oxygen.

In some embodiments, after the filling with the fill product, a closure can be immediately attached to the plastic container. For this purpose, as shown schematically in FIG. 5, in a further embodiment, a combination is provided of a filling nozzle 5 (indicated schematically) and a capper 54 (indicated schematically), which can be brought into engagement alternately with the mouth area 32 of the plastic container 3. Accordingly the plastic container 3 is first evacuated via the filling nozzle 5, as described above, and then charged with the fill product, following which the container closure is attached by means of the capper 54. The capper 54 and the filling nozzle 5 are thereby disposed in a common capper area 56, which is sealed against the environment. Thus a charging pressure applied via the filling nozzle 5, which is for example supplied by a pressure gas device 7, can also be supplied to the capper area 56, so that capping of the plastic container 3 can be carried out under the charging atmosphere and in particular at the charging pressure.

After the plastic container 3 is capped, it is demolded from the blow mold 2, discharged, and conveyed to a further treatment or to the subsequent production steps.

The device 1 can thus, in certain embodiments, extend a stretch blow molding machine, which includes, among other components, a blow mold 2 in a manner known in the art, in that it can enable the very rapid filling of a plastic container 3 that is manufactured in the blow molding device and still accommodated in the blow mold 2. For this purpose, an underpressure is provided in the interior space I of the plastic container 3, so that the plastic container 3 can be filled with the fill product immediately after its manufacture, and the filling process is substantially a vacuum filling process. To achieve this, after its outer contours have been formed, i.e., after the blow molding process, the plastic container 3 is first depressurized, so that ambient pressure conditions again prevail within it, and subsequently the plastic container 3, which is still accommodated in the blow mold 2, is charged with an underpressure, in order to provide a pressure in the interior space I which is below the ambient pressure (1 bar absolute pressure). In various embodiments, a similar pressure, such as a pressure of equal magnitude, prevails on the outside of the plastic container 3 and in the interior space I of the plastic container 3, in order to prevent the collapse of the plastic container 3. Before the final evacuation of the interior space I prior to the filling of the plastic container 3, further steps, for example flushing steps, can be performed in order to provide a defined atmosphere in the interior space I. For this purpose, for example, the interior space I of the plastic container 3 can be evacuated at least once, then charged again with a defined gas, for example an inert gas such as $CO_2$, in order, following the renewed evacuation, to ensure prior to filling that the residual gas present in the plastic container 3 contains only a small portion of oxygen, or virtually none.

When the fill product, which is at a relative overpressure, is introduced into the interior space I, which is at an underpressure, the fill product is ejected into the interior space I in a sudden burst, with the result that the filling can be carried out at a very high speed. After the fill product has settled in the plastic container 3, both the interior space I of the plastic container 3 and the exterior space O can be returned to ambient pressure. Subsequently, the blow mold 2 can be opened and the plastic container 3 can be removed.

If still fill product is introduced into the plastic container 3, the container can be returned to ambient pressure immediately following the filling process. If, however, the fill product is carbonated, a sufficiently long settling time must be allowed, in order to enable the fluid to settle. Alternatively, as shown for example in FIG. 5, the plastic container 3 can be capped while still in the blow mold, immediately after the filling process and, in some embodiments, the application of a charging pressure.

In further embodiments, the preform 30 can be inserted in the blow mold 2 and then at this early stage the exterior space O, i.e. the space between the preform 30 and the inner wall 22 of the cavity 20 of the blow mold 2, can be evacuated, so that a predetermined underpressure exists. In this manner, the blowing process or blow molding process can be accelerated, or else the pressure to be applied to the interior space I for blow molding can be reduced. This is advantageous, since less compressed air is then required, and the blowing process as a whole becomes thereby more efficient.

After the contours of the plastic container 3 are formed with the applicable overpressure in the interior space I of the plastic container 3, the interior space I is then evacuated, so that similar or identical pressure conditions prevail in the interior space I of the plastic container 3 and in the exterior space O between the outer wall 300 of the plastic container 3 and the inner wall 22 of the cavity 20 of the blow mold 2. In this manner, it is also possible to prevent damage to, or collapse of, the plastic container 3 when the interior space I is evacuated.

In the example embodiments described above, the fill product is introduced into the plastic container 3 via a separate filling nozzle 5. The filling nozzle 5 and the blowing nozzle 4 can however also be combined. In particular, the blowing nozzle 4, by means of which the overpressure for blow molding the plastic container 3 is applied, can also apply the underpressure, the fill product and if applicable the pressure gas. Accordingly, the combined blowing/filling valve can remain in position, and no time is required to change between the blowing valve and the fill product valve, with the result that the process as a whole can be accelerated.

When the blowing nozzle is also used as the fill product nozzle, it is also possible to use a conventional blow molding machine if it is extended to comprise the vacuum device described above, in order to enable the evacuation of the fully formed plastic container 3, and if it is further extended to comprise the fill product feed, by means of which the fill product is supplied. In this case it must however be ensured that the blow mold 2 is designed in a sufficiently pressure-tight manner to enable a vacuum to be provided in the exterior space O between the container wall 300 and the inner wall 22 of the cavity 20 of the blow mold 2.

The pressure in the exterior space O can be provided by various different means. For example, it can be applied in the area of the container mouth directly to the blow mold wall, in which case the underpressure is applied by means of a sucking process in the area of the container mouth, i.e. at a similar position to that at which the underpressure which must be provided in the interior space I of the plastic container is applied. The underpressures in the interior space I of the plastic container 3 and in the exterior space O of the plastic container 3 are, in some embodiments, achieved by the same device, for example in this case via the blowing nozzle. By means of a connection, the same pressure is provided in the interior space I and the exterior space O.

It is, however, also possible, as shown in the figures above, for drilled holes, such as for example the pressure equalization channel 28, to be provided in the area of the wall of the blow mold 22. These drilled holes can also be connected with a vacuum device 6 when the interior space I is evacuated, and accordingly here too the same level of pressure can be produced in the interior space I and in the exterior space O, in order to prevent the collapse of the plastic container 3.

The pressures that are produced in the interior space I and the exterior space O can be isolated from each other, as in the above-mentioned example embodiment, such that they are not configured to be in communication with each other. It can, however, be achieved by means of a suitable controller that the pressures in the interior space I and the exterior space O, though separately adjusted, are identical.

The pressures can also be maintained at the same level during the entire filling process if, for example, it is ensured via a sensitive overpressure valve that the gas residue which accumulates in the headroom is forced out, so that despite the filling process and the increasing volume filled into the plastic container 3 the pressure in the plastic container remains substantially the same.

It is, however, additionally desired in some embodiments, that during the filling process a relative overpressure develops in the interior space I with respect to the exterior space O, so that the container wall 300 is pressed outwards, which can also give rise to a change in pressure in the exterior space O. An overpressure in the plastic container 3 can, for example, also be used to determine the end of the filling process, if the pressure is measured appropriately, and the filling process can thereby be ended when a predetermined pressure, which takes into account the initial pressure in the interior space I, is reached.

Several additional possibilities are provided in order to inhibit the baking-on or adhesion of the container wall 300 onto the inner wall 22 of the cavity 20 of the blow mold 2. For example, the blow mold, and in particular the exterior space O between the preform 30 and the inner wall 22, can be evacuated immediately after the preform 30 is inserted, so that the applicable underpressure is already present prior to the beginning of the blow molding process or stretch blow molding process. In this manner, the blow molding process can be carried out more efficiently. Pressure control can then be achieved by means of the blowing nozzle and/or suitable access means, such as drilled holes or channels in the inner wall 22 of the blow mold. In a variant, the pressure control can be achieved by means of the blowing nozzle alone, which can act on both the interior space I and the exterior space O if the preform is disposed accordingly.

In an alternative embodiment, the underpressure on the outside O of the plastic container 3 can be applied only after it has been blow molded, wherein in this case again the pressure control can be carried out either via separate pressure channels in the blow mold or via the blowing nozzle itself.

The method can, for example, be carried out such that a blowing nozzle 5 is disposed upon the closed blow mold 2, which accommodates a preform 30. The blow molding process is then carried out in the known manner. After the plastic container 3 has been formed, an underpressure is applied at the blowing nozzle 5 in order to evacuate the plastic container 3. By this means, the plastic container 3 detaches easily from the inner wall 22 of the blow mold 2, since in such a case the pressures are not in equilibrium. Accordingly, the plastic container 3 contracts slightly, with the result that it detaches from the inner wall 22 of the blow mold 2. After it has detached, however, underpressure is usually applied in the exterior space O, and this underpressure is typically substantially the same as that in the interior space I, in order to establish pressure equilibrium and so avoid further deformations. Following this, the filling method can be carried out as described above, namely by means of the introduction of fill product into the evacuated interior space I of the plastic container 3.

At the end of the filling process, the underpressure that is present in the exterior space O can be removed, for example, by means of ventilation. The overpressure that is present in the headroom of the plastic container 3 can thereby be maintained. As an alternative, however, the overpressure that was applied in the headroom of the plastic container 3 by the filling process can also be guided into the exterior space O. By means of this overpressure, the detaching of the container wall 300 from the inner wall 22 of the blow mold 2 is facilitated. During the filling of the plastic container 3, a slight overpressure arises, with the result that the container recovers its original shape. Accordingly, in this case the advantage of rapid filling in the vacuum can be combined with full molding of the plastic container 3 on the wall of the blow mold, and at the same time easy detaching from the wall of the blow mold. The original shape can also be produced by means of the introduction of additional pressure into the plastic container 3.

The pressure conditions in the exterior space O can be controlled, again via the applicable feed channels, so that the container wall 300 is prevented from baking onto the wall of the blow mold 22 by means of the adjustment of the underpressure in the exterior space O such that less underpressure is applied than in the interior, with the result that the plastic container 3 contracts slightly. Furthermore, at specified points in the process additional gas can also be actively introduced through the channels in the wall of the blow mold. In both variants, slight contraction of the plastic container 3 is achieved, so that the container detaches easily.

In order to achieve easy detaching of the plastic container 3 from the mold, it may be desired to form an air cushion in the exterior space O, i.e. between the wall of the blow mold 22 and the wall of the container 300. The air cushion, i.e. the slight overpressure, must be formed such that no visible deformation of the plastic container 3 takes place, but an air cushion or air bearing is created, in order to prevent the plastic container 3 from baking on. This air cushion can be established at various points in the process, wherein, depending on the shape of the container and the material used, it may be sufficient to create the air cushion only shortly before the opening of the blow mold 2, in order to simplify the separation of the plastic container 3 from the blow mold 2.

Figure 6:
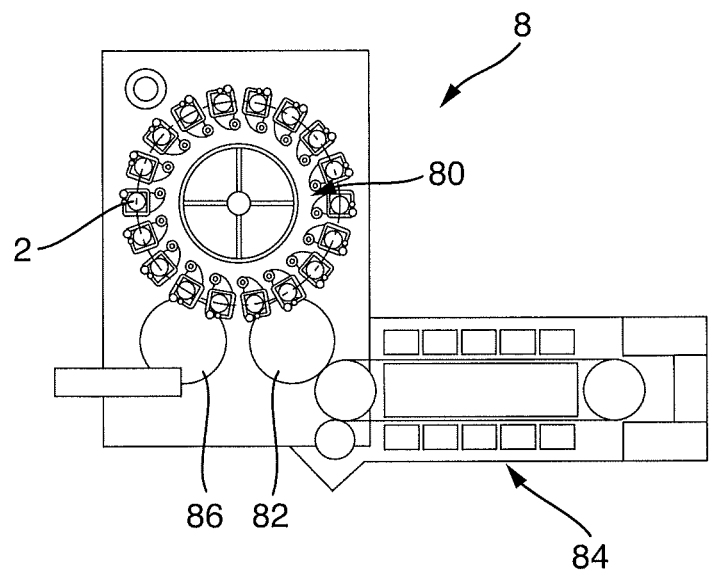
FIG. 6 is a schematic plan view of a stretch blow molding machine according to a first embodiment.

In FIG. 6 a schematic plan view of a stretch blow molding machine 8 can be seen, wherein individual blow molds 2, for example such as are described in the above example embodiments, are disposed in a rotary carousel 80, and accordingly circulate. Preforms are conveyed via an in-feed starwheel 82 from the heating module 84 to the individual blow molds 2 in the rotary carousel 80. Via a discharge starwheel 86, the finished blow molded and filled plastic containers are discharged and conveyed to their further processing. On the rotary carousel 80, the individual blow molds 2 are thus filled with the fill product, as described in the previous example embodiments, wherein prior to the filling of each plastic container with the fill product the plastic container is evacuated, in order that rapid filling of the thus evacuated plastic containers can take place. At the same time, the plastic container 3 is stabilized by the underpressure applied in the exterior space O. Accordingly, it is possible to achieve a high output with a relatively small number of blow molds 2 on the rotary carousel 80. It is possible in this manner to dispense with a separate downstream filler.

Figure 7:
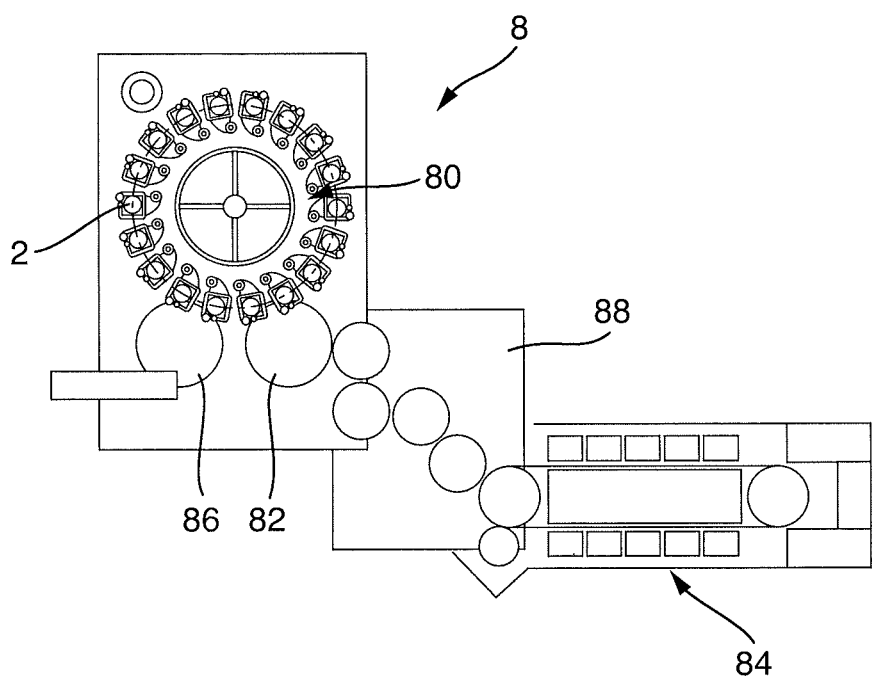
FIG. 7 is a schematic plan view of a stretch blow molding machine according to a second embodiment.

FIG. 7 shows another embodiment of the stretch blow molding machine 8, in which between the heating module 84 and the blow molds 2 a sterilization module 88 is also provided, by means of which the preforms that have been brought to their processing temperature in the heating module 84 can be sterilized before they are introduced into the applicable cavities of the blow molds 2, which are again disposed in a rotary carousel 80. Sterile filling of the fill product can accordingly be achieved on the rotary carousel 80 after the blow molding of each plastic container in the blow molds, in the manner described above.

Figure 8:
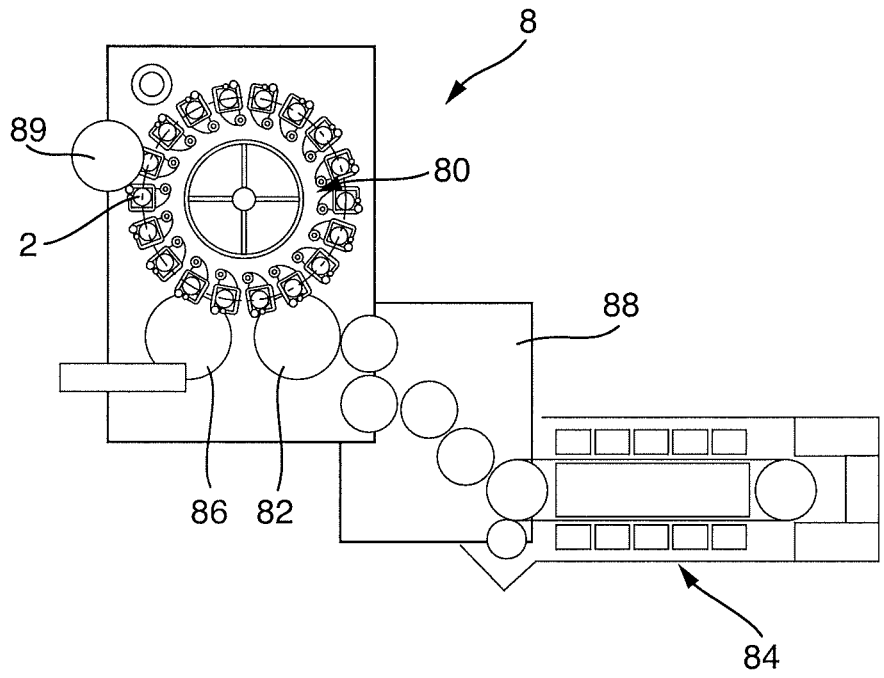
FIG. 8 is a schematic plan view of a stretch blow molding machine according to a third embodiment.

FIG. 8 shows a further embodiment of a stretch blow molding machine 8, in which both the heating module 84 and the sterilization module 88 are provided. Additionally on the rotary carousel 80 a capper 89 is provided, by means of which it is possible to fit the plastic containers with closures after they have been blow molded and filled with fill product in the filler carousel 80. Accordingly, on the rotary carousel 80 the plastic containers are manufactured, in that preforms that have been heated in the heating module 84 and sterilized in the sterilization module 88 are blow molded in the blow mold 2 into plastic containers. Then on the rotary carousel the evacuated plastic containers are filled with the fill product, in a manner that enables very rapid filling in a sudden burst. Then in addition the capping of the plastic containers is carried out at the capper 89, which is also on the rotary carousel 80.

In this manner, rapid filling can be combined with the capping of the plastic containers, while they are still disposed in the blow mold 2. The plastic containers can also be filled efficiently in this manner when they are filled with a carbonated fill product, if the carbonated fill product is filled into the underpressure that is provided in the plastic container.

The closures in the closure feed to the capper 89 in FIG. 8 are supplied in a vacuum chamber, such that the closures are fed into the vacuum chamber via an airlock. Capping with the closures can thus take place under vacuum conditions.

In other words, the capper 87 can enable the capping of the filled plastic containers without the interior space of the plastic container being first returned to ambient pressure.

Capping of the filled plastic containers 3 can thus be achieved in pressure conditions that correspond to the pressure conditions at the time of filling, or at the time of subsequent pressurization with pressure gas.

Figure 9:
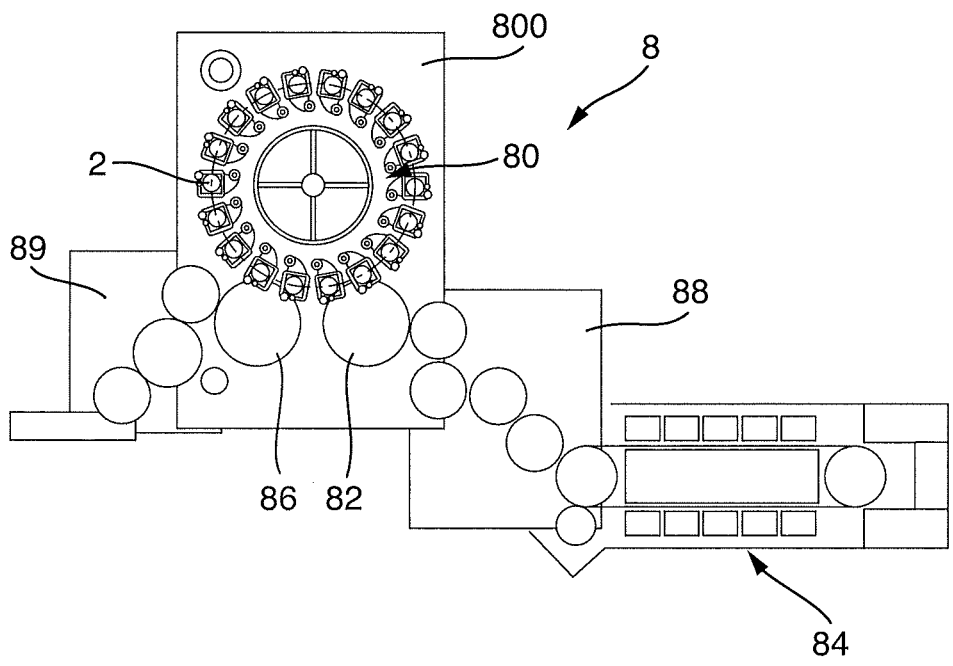
FIG. 9 is a schematic plan view of a stretch blow molding machine according to a fourth embodiment.

FIG. 9 shows another embodiment of a stretch blow molding machine 8, in which again the heating module 84 and the sterilization module 88 ensure that heated and sterilized preforms are supplied via the in-feed starwheel 82 to each of the blow molds 2 that are disposed on the rotary carousel 80. On the rotary carousel 80, the plastic container is not only manufactured but also completely filled with the fill product. A capper 89, which in this example embodiment is disposed behind the discharge starwheel 86, ensures that the fully filled plastic containers, which were removed from the blow molds 2 and discharged via the discharge starwheel 86, are then immediately capped in the capper 89.

In this case, the capper is, for example, disposed on the platform 800 of the stretch blow molding machine 8, in order that a device can be designed as a whole in a particularly compact and self-contained manner.

Figure 10:
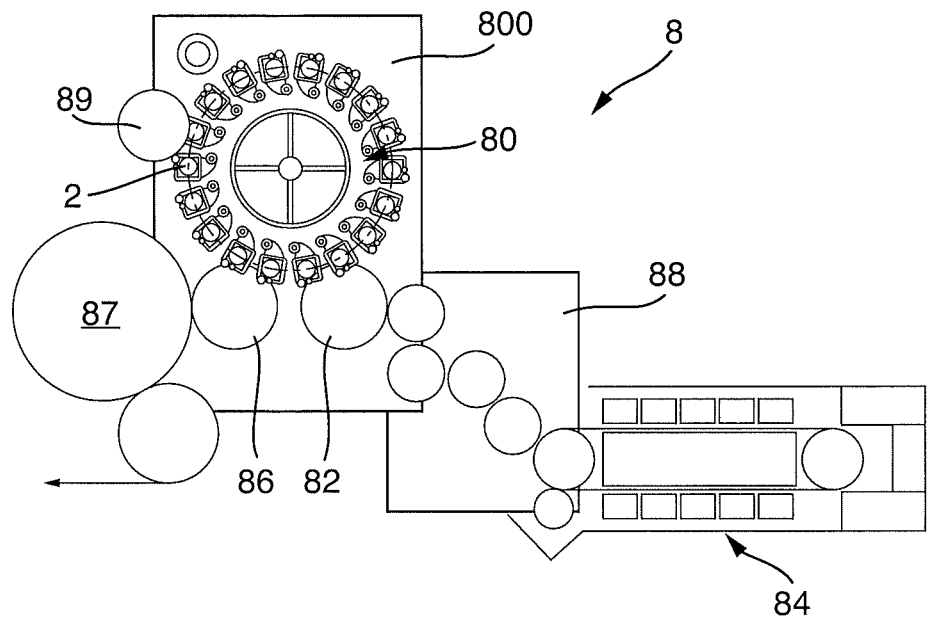
FIG. 10 is a schematic plan view of a stretch blow molding machine according to a fifth embodiment.

FIG. 10 shows an additional embodiment of an extension of the stretch blow molding machine 8, in which there again takes place the heating of the preform in the heating module 84, subsequent sterilization in the sterilization module 88, feeding via the in-feed starwheel 82 onto the rotary carousel 80 with the blow molds 2, so that the plastic containers manufactured in the blow molds 2 can be filled with fill product on the rotary carousel 80, and again capping by the capper 89, which is also disposed on the rotary carousel 80 in order that the plastic containers, which are filled with fill product, can be capped with a container closure while still in the blow molds 2. In addition, a labeling module 87 is provided, which receives the blow molded, filled and capped plastic containers via the discharge starwheel 86 and labels them appropriately. In certain embodiments, the labeling also takes place while the filled plastic containers are still in the rotary carousel 80, namely immediately after they are removed from the blow molds.

Figure 11:
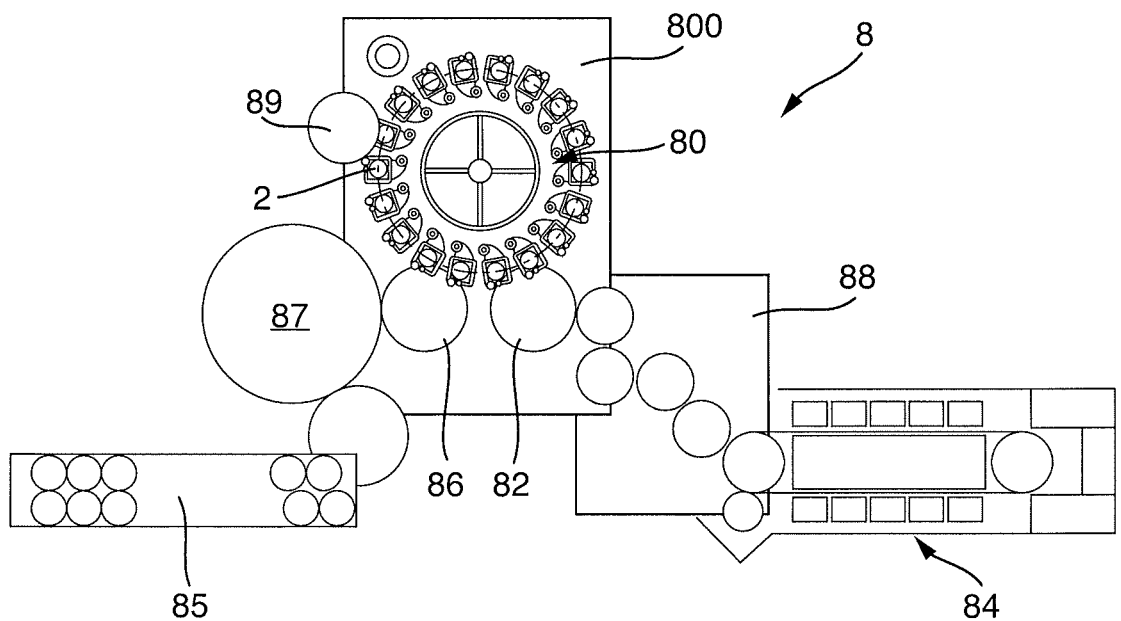
FIG. 11 is a schematic plan view of a stretch blow molding machine according to a sixth embodiment.

In FIG. 11, a further development of the device shown in FIG. 10 can be seen, wherein a transport belt 85 is additionally provided, upon which the manufactured, filled, capped and labeled plastic containers are transported onwards. The plastic containers can be discharged onto the transport belt 85 via a distribution delay starwheel, and thereby transported in two rows, or a plurality of rows, side by side.

Figure 12:
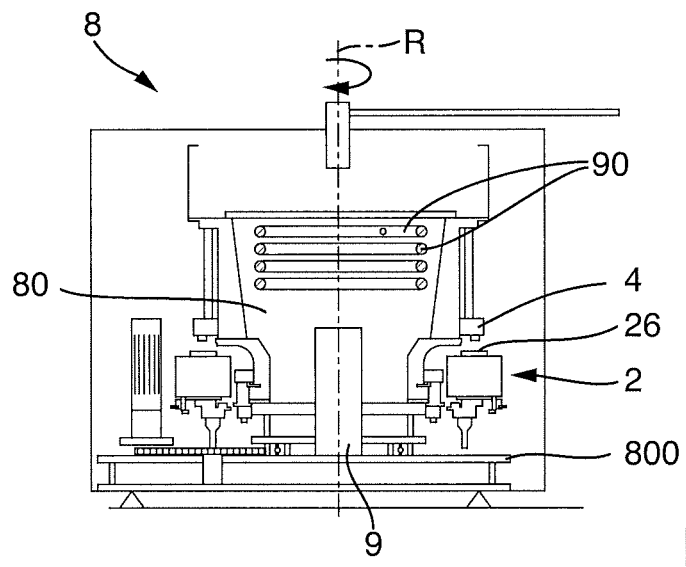
FIG. 12 is a schematic sectional view through a stretch blow molding machine with a medium distributor according to a first embodiment.

FIG. 12 shows schematically a sectional view through the stretch blow molding machine 8, wherein the blow molds 2 are retained on the carousel such that they can circulate about an axis of rotation R. Above the blow molds 2 are disposed blowing nozzles 4, which can be lowered onto a corresponding inlet area 26 of the blow mold 2, in order thereby to provide a pressure-tight connection for blow molding and evacuating the plastic containers, and charging them with fill product.

A rotary medium distributor 9 with a plurality of distribution lines 90 is provided, wherein the rotary medium distributor is disposed on the platform 800 of the stretch blow molding machine 8, and the distribution lines 90 are correspondingly disposed on the rotary carousel 80. By means of the rotary medium distributor 9, both a tempering fluid, for tempering the blow molds 2, and the fill product can be distributed from the static part of the stretch blow molding machine 8 to the rotating part. Via the medium distributor 9, compressed air or a vacuum can additionally be transferred from the static part to the rotating part. Other media, electric power or control signals can also be transferred in this manner.

Figure 13:
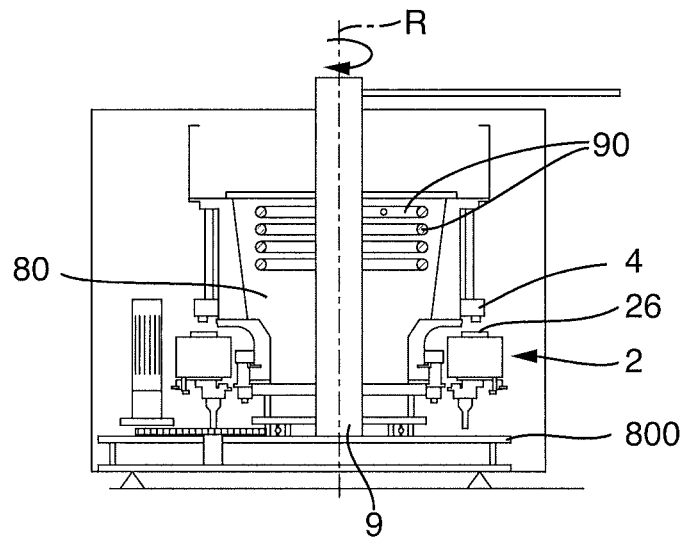
FIG. 13 is a schematic sectional view through a stretch blow molding machine according to a second embodiment.
Figure 14:
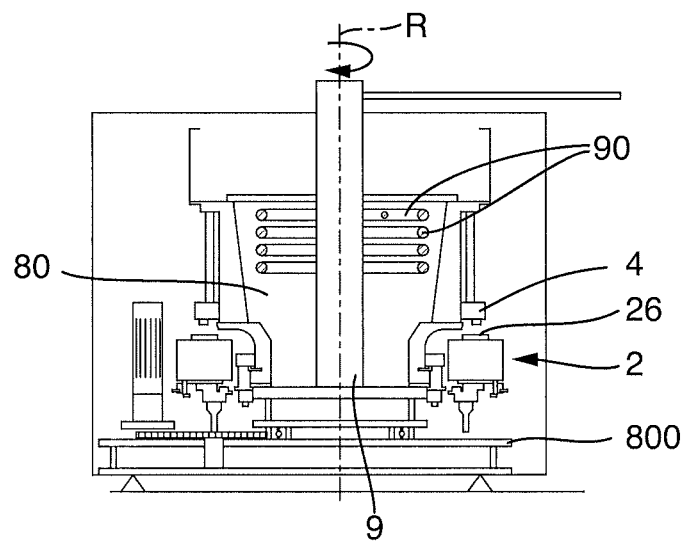
FIG. 14 is a schematic sectional view through a stretch blow molding machine according to a third embodiment.

In FIG. 13 another embodiment is shown, in which the rotary medium distributor 9 is implemented in a continuous form. By means of the rotary medium distributor 9, all media can be transferred from the static part to the rotating part. In this case, either the rotary medium distributor 9 can be disposed on the platform 800, as shown in FIG. 13, or else it can rotate with the blowing wheel or the rotary carousel 80, as shown in FIG. 14.

Figure 15:
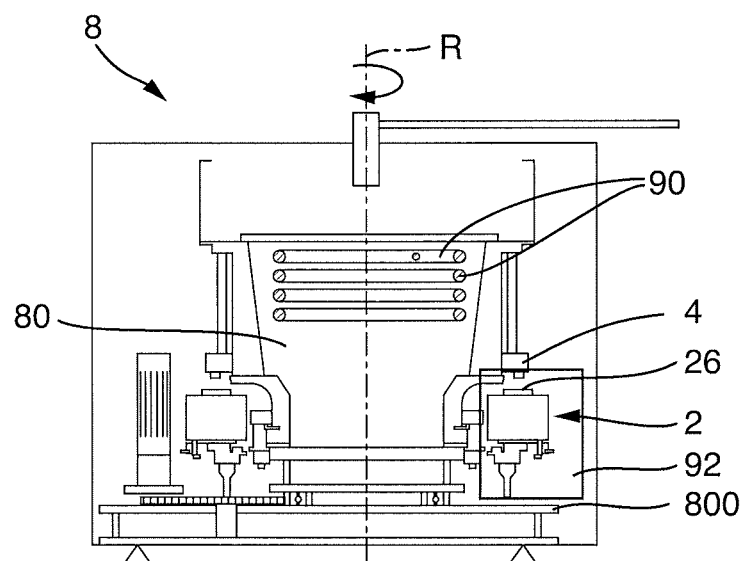
FIG. 15 is a schematic sectional view through a stretch blow molding machine according to a fourth embodiment.

FIG. 15 shows yet another embodiment of the stretch blow molding machine 8, wherein in this case each blow mold 2, or the entire rotary carousel 80, is disposed in an isolator 92, wherein the preforms are conveyed into the isolator and the filled plastic containers are carried out of the isolator, wherein accordingly an airlock is provided, such that a constant underpressure can be maintained in the isolator 92.

Figure 16:
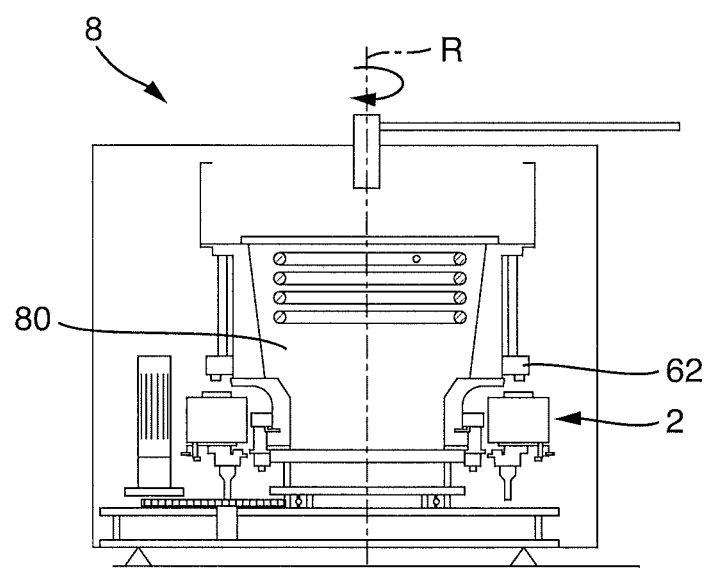
FIG. 16 is a schematic sectional view through a stretch blow molding machine according to a fifth embodiment.

FIG. 16 shows a schematic representation of the stretch blow molding machine 8, in which it is possible via a vacuum line 62 to evacuate the intervening space between the container wall and the inner wall of the cavity of the blow mold 2. This evacuation can take place either immediately after the insertion of the preform, or only after the manufacture of the plastic container has been completed.

Figure 17:
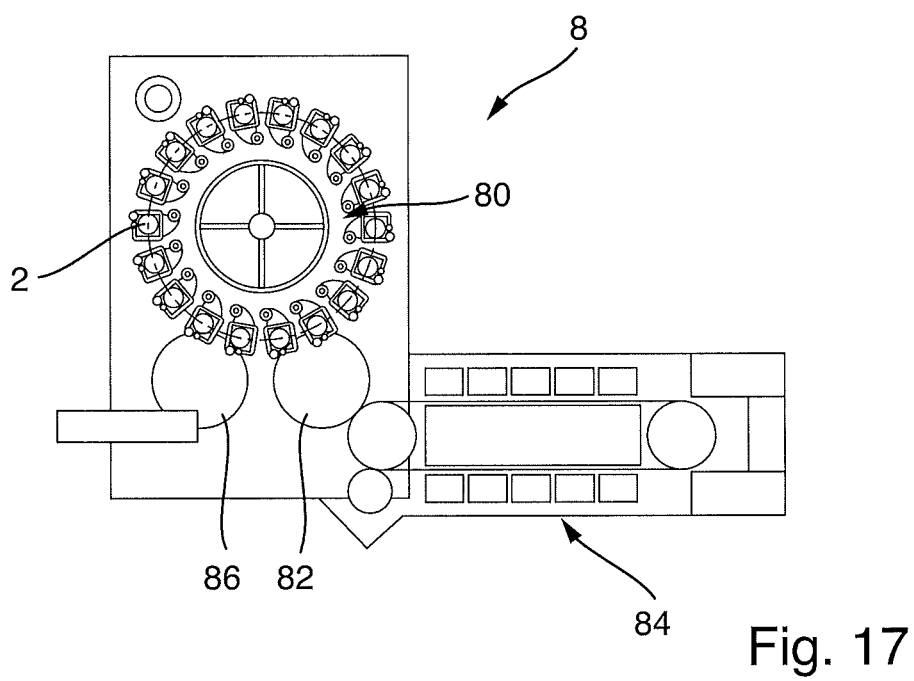
FIG. 17 is a schematic plan view of a stretch blow molding machine according to a sixth embodiment.

FIG. 17 shows schematically a particularly compact design of a stretch blow molding machine 8, in which the rotary carousel 80 is configured such that each of the blow molds 2 require at least two revolutions in order to carry out both the stretch blow molding process, for manufacturing the plastic container that is to be filled, and the filling process, possibly along with the capping and labelling processes. For this purpose, there is, in various embodiments, an uneven number of blow molds, and in each case every second blow mold is charged with a preform, and correspondingly after a second revolution the finished plastic container is removed. The progression between stages can thereby be achieved by the provision of an uneven number of blow molds 2.

Figure 18:
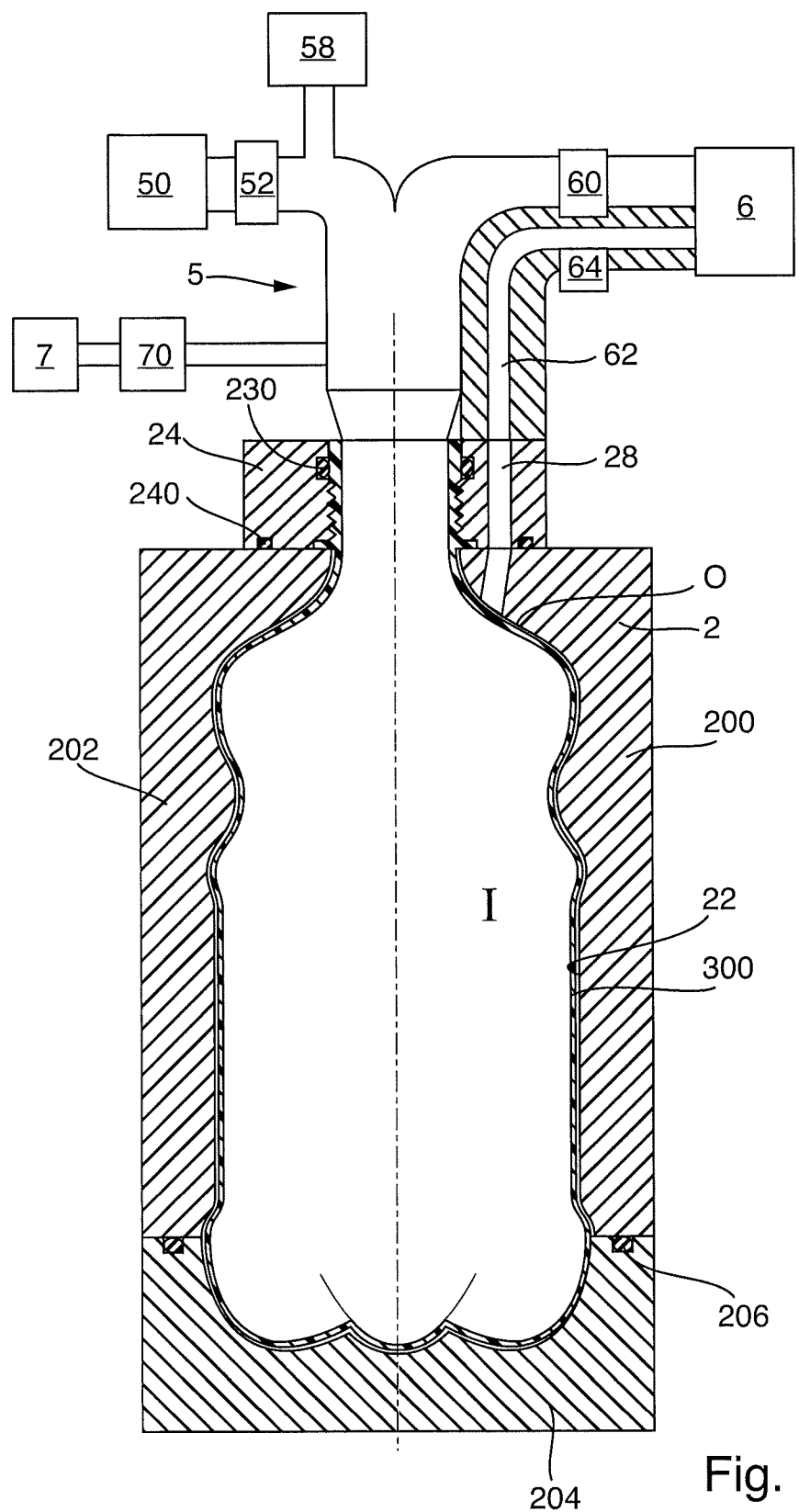
FIG. 18 is a schematic sectional view through a device according to FIG. 4 in one embodiment, with an additional aroma doser.

FIG. 18 shows another embodiment based on the device 1 that has already been described in connection with FIGS. 1 to 4. In addition to the features provided in FIG. 4, a flavor doser 58 is provided, by means of which flavorings and/or beverage supplements and/or beverage components can be dosed into the interior space I of the plastic container 3. The term "beverage supplements" is to be understood here also to include syrup and/or preservatives.

In the example embodiment that is shown, the flavor doser 58 discharges into the filling nozzle 5, so that the flavoring and/or the beverage supplement and/or the beverage component that is supplied reaches the plastic container 3 by the same route as the fill product that is supplied by the fill product feed 50.

In the example embodiment that is shown, the flavor doser 58 discharges into the filling nozzle 5 downstream of the fill product valve 52, so that dosing of flavorings and/or beverage supplements and/or beverage components can also take place when the fill product valve 52 is closed. The dosing can therefore be carried out before the introduction of the fill product from the fill product feed 50, during the filling of the fill product or after the conclusion of the filling process. Dosing after the conclusion of the filling process and after the settling of the fill product in the plastic container 3 is sometimes desired.

The flavor doser 58 can be designed for example in the form of a peristaltic pump, by means of which precise dosing is possible of the applicable flavor, or the applicable beverage supplement, or the applicable beverage component from a corresponding reservoir.

A plurality of flavor dosers 58 can also be provided, or alternatively by means of a single flavor doser 58, different flavorings and/or beverage supplements and/or beverage components can be supplied, so that the flavor doser or dosers 58 are configured, and can be controlled, such that for each individual filling process it is possible to select a different flavoring concentration and/or beverage supplement concentration and/or beverage component concentration, and/or combination of flavorings and/or beverage supplements and/or beverage components. In a normal filling operation, however, for operational reasons, batches of a first taste are usually filled initially, before any change of taste takes place. The same applies in the case of a change between types of beverage, such as for example between beverages with fruit fiber and beverages without fruit fiber.

Figure 5:
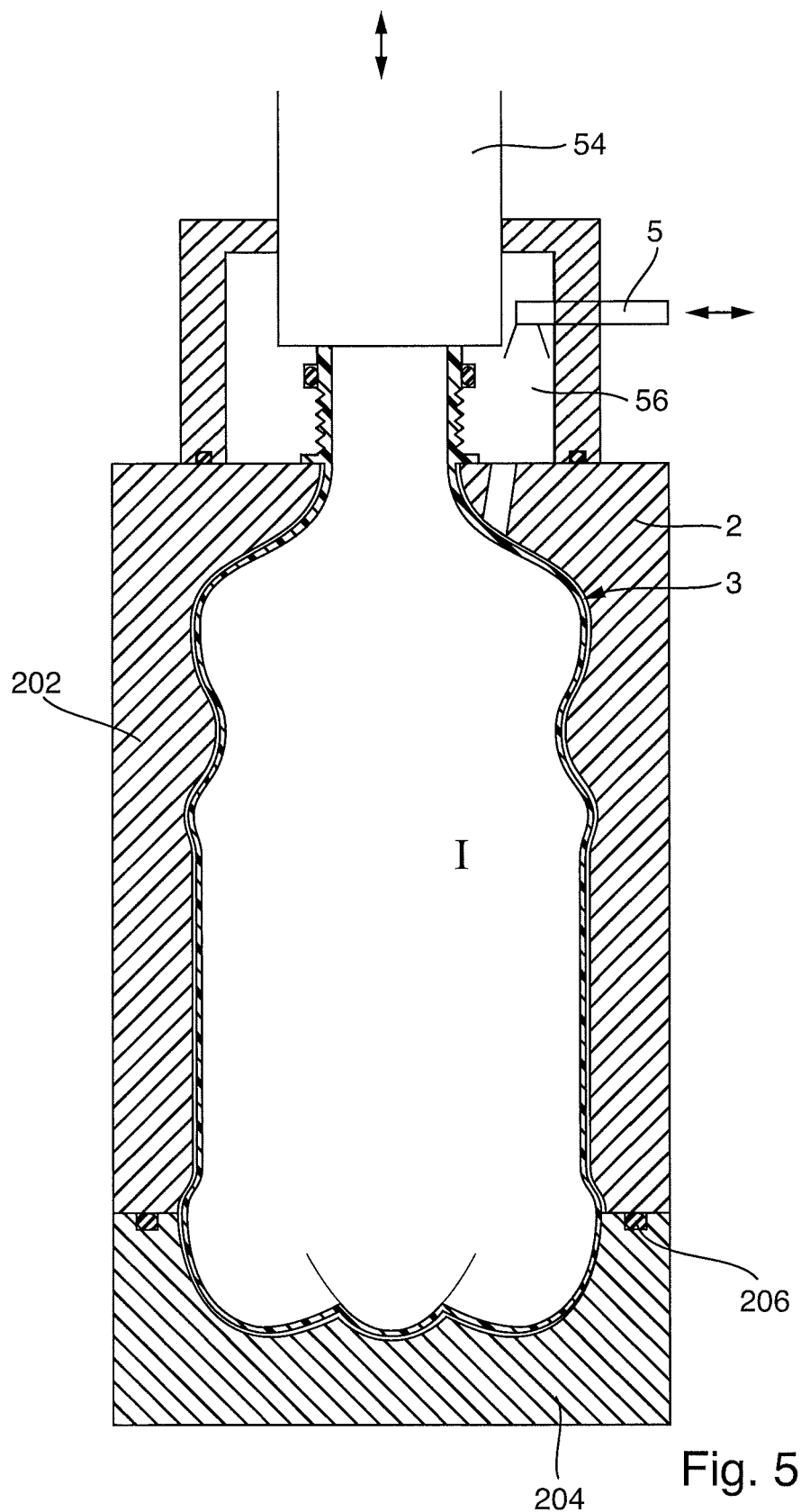
FIG. 5 is a schematic sectional view through a second device for manufacturing and filling a plastic container.
Figure 19:
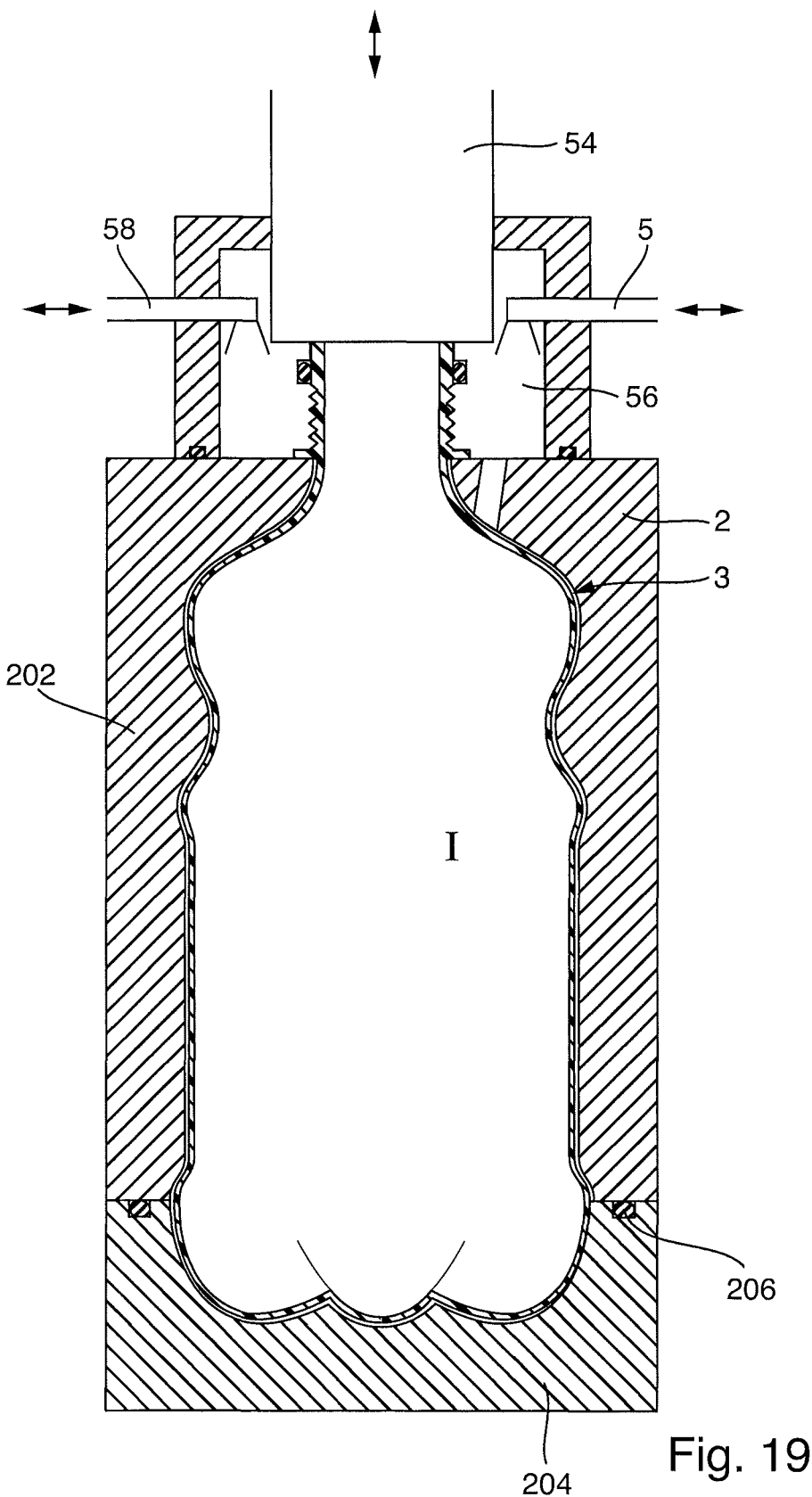
FIG. 19 is a schematic sectional view through a device according to FIG. 5 in one embodiment, with an additional aroma.

FIG. 19 shows another embodiment based on the example embodiment shown in FIG. 5. In addition to the filling nozzle 5 (indicated schematically), which can be displaced or swiveled, the inflow of a flavor doser 58 is also provided in the capper area 56.

The flavor doser 58 is positioned over the mouth of the plastic container 3, in order to dose flavorings and/or beverage supplements and/or beverage components into the interior space I of the plastic container 3. The flavor doser 58 can thereby be positioned over the mouth prior to the filling of the plastic container 3 with the fill product, or after the conclusion of the filling process. The filling nozzle 5 and the flavor doser 58 accordingly exchange their positions over the mouth of the plastic container 3.

To the extent applicable, all individual features described in the individual example embodiments can be combined with each other and/or exchanged, without departing from the field of the invention.

The invention claimed is:

1. A method for manufacturing and filling a plastic container, comprising:
    introducing a preform into a blow mold;
    pressurizing the preform with a blowing medium to manufacture the plastic container;
    evacuating, with a filling nozzle engaged with a mouth of the plastic container forming a seal, an interior space of the plastic container to an underpressure, wherein a volume of the interior space remains substantially the same during the evacuating; and
    introducing, with the filling nozzle, a fill product into the evacuated interior space at an overpressure wherein, during the introducing, no fluid is displaced by the fill product and no fluid flows out of the interior space.

2. The method of claim 1, wherein the fill product is supplied at an absolute pressure of about 1 bar to 9 bar.

3. The method of claim 1, wherein the overpressure corresponds to ambient pressure, a saturated pressure of the fill product, or a pressure higher than the saturated pressure of the fill product.

4. The method of claim 3, wherein the overpressure corresponding to the saturated pressure of the fill product is an absolute pressure of about 1.1 bar to 6 bar, the overpressure higher than the saturated pressure of the fill product is an absolute pressure of about 1.6 bar to 9 bar, or both.

5. The method of claim 1, further comprising pressurizing the plastic container with a pressure gas at an absolute pressure of about 2 bar to 9 bar after the introduction of the fill product.

6. The method of claim 1, further comprising evacuating an exterior space that is defined between the preform and an inner wall of a cavity of the blow mold to an underpressure prior to pressurizing the preform, evacuating the interior space, and/or introducing the fill product.

7. The method of claim 6, wherein the exterior space is evacuated to an absolute pressure of about 0.5 bar to 0.05 bar.

8. The method of claim 6, further comprising equalizing pressure in the interior space and in the exterior space prior to introducing the fill product.

9. The method of claim 6, wherein pressure in the interior space is lower than pressure in the exterior space to detach the plastic container from an inner wall of a cavity of the blow mold.

10. The method of claim 1, further comprising pressurizing the plastic container with a pressure gas at a second overpressure after introducing the fill product.

11. The method of claim 1, further comprising flushing the interior space of the plastic container with an inert gas before evacuating the interior space.

12. The method of claim 1, wherein the fill product comprises a carbonated fill product or a still fill product.

13. The method of claim 1, further comprising applying a vacuum to a space outside of the plastic container that enables the volume of the interior space to remain substantially the same during the evacuating.

* * * * *